（12）United States Patent
Wang et al.

(10) Patent No.: US 12,212,746 B2
(45) Date of Patent: Jan. 28, 2025

(54) VIDEO DECODING METHOD AND APPARATUS, VIDEO CODING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Yingbin Wang, Shenzhen (CN); Xiaozhong Xu, Shenzhen (CN); Shan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 210 days.

(21) Appl. No.: 17/939,767

(22) Filed: Sep. 7, 2022

(65) Prior Publication Data

US 2023/0020127 A1    Jan. 19, 2023

Related U.S. Application Data

(63) Continuation of application No. PCT/CN2021/112133, filed on Aug. 11, 2021.

(30) Foreign Application Priority Data

Aug. 20, 2020   (CN) .......................... 202010841108.9

(51) Int. Cl.
*H04N 19/119*   (2014.01)
*H04N 19/13*    (2014.01)
*H04N 19/176*   (2014.01)

(52) U.S. Cl.
CPC ........... *H04N 19/119* (2014.11); *H04N 19/13* (2014.11); *H04N 19/176* (2014.11)

(58) Field of Classification Search
CPC .. H04N 19/105; H04N 19/119; H04N 19/129; H04N 19/13; H04N 19/176;
(Continued)

(56) References Cited

U.S. PATENT DOCUMENTS 6,111,833 A *   8/2000   Nakagawa .......... H04L 25/4906
9,992,496 B1 *  6/2018   Maaninen .............. H04N 19/91
(Continued)

FOREIGN PATENT DOCUMENTS

CN    102404571 A    4/2012
CN    105973287 A    9/2016
(Continued)

OTHER PUBLICATIONS

The World Intellectual Property Organization (WIPO) International Search Report for PCT/CN2021/112133 Nov. 11, 2021 6 Pages (including translation).
(Continued)

*Primary Examiner* — Peter D Le
(74) *Attorney, Agent, or Firm* — ANOVALAW GROUP PLLC

(57) ABSTRACT

This application relates to the field of video coding and decoding technologies, and provides a video decoding method and apparatus, a video coding method and apparatus, a device, and a storage medium. The method includes decoding, from a bit stream, a binary symbol string with string length information of a current string, the string length information comprising information related to a string length of the current string; inversely binarizing the binary symbol string according to a string length resolution (SLR) of the current string, to obtain the string length information; and determining the string length of the current string according to the string length information.

19 Claims, 6 Drawing Sheets

(58) Field of Classification Search
CPC .... H04N 19/182; H04N 19/593; H04N 19/70; H04N 19/91

See application file for complete search history.

(56) References Cited

U.S. PATENT DOCUMENTS

| | | | |
|---|---|---|---|
| 10,511,834 B2 | 12/2019 | Xu et al. | |
| 10,542,253 B2 | 1/2020 | Liu et al. | |
| 10,575,013 B2 | 2/2020 | Liu et al. | |
| 10,701,385 B1 | 6/2020 | Xu et al. | |
| 2002/0105885 A1* | 8/2002 | Oki | G11B 20/1426 369/59.24 |
| 2009/0067734 A1* | 3/2009 | Kalevo | H04N 19/46 382/238 |
| 2011/0293004 A1* | 12/2011 | An | H04N 19/96 375/240.13 |
| 2012/0014433 A1* | 1/2012 | Karczewicz | H03M 7/40 375/E7.126 |
| 2013/0272389 A1* | 10/2013 | Sze | H04N 19/124 375/240.03 |
| 2014/0334552 A1* | 11/2014 | Yamaguchi | H04N 19/44 375/240.25 |
| 2015/0049819 A1* | 2/2015 | Lee | H04N 19/91 375/240.23 |
| 2017/0195692 A1* | 7/2017 | Yu | H04N 19/91 |
| 2017/0295376 A1 | 10/2017 | Lee et al. | |
| 2018/0007359 A1* | 1/2018 | Hsiang | H04N 19/91 |
| 2018/0205951 A1* | 7/2018 | Hsiang | H04N 19/13 |
| 2019/0068994 A1* | 2/2019 | He | H04N 19/13 |
| 2019/0174131 A1* | 6/2019 | Abe | H04N 19/13 |
| 2019/0325083 A1 | 10/2019 | Payer et al. | |
| 2020/0036978 A1* | 1/2020 | Kim | H04N 19/122 |
| 2020/0112729 A1 | 4/2020 | Lee et al. | |
| 2022/0345706 A1* | 10/2022 | Wang | H04N 19/93 |
| 2022/0385922 A1* | 12/2022 | Galpin | H04N 19/176 |
| 2023/0017193 A1 | 1/2023 | Wang et al. | |

FOREIGN PATENT DOCUMENTS

| | | |
|---|---|---|
| CN | 111131818 A | 5/2020 |
| CN | 112543332 A | 3/2021 |
| WO | 2016119726 A1 | 8/2016 |

OTHER PUBLICATIONS

Benjamin Bross et al. "General Video Coding Technology in Responses to the Joint Call for Proposals on Video Compression with Capability beyond HEVC", 2019, vol. 30, No. 5, IEEE Transactions on Circuits and Systems for Video Technology.

Shan Liu et al. "Overview of HEVC extensions on screen content coding", vol. 4. 2015, Cambridge University Press.

Benjamin Bross et al. "Versatile Video Coding (Draft 2)" , Jul. 10-18, 2018, ISO/IEC JTC1/SC29/WG11 JVET-K1001.

Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 1.

Kiaozhong Xu et al. "Intra Block Copy in HEVC Screen Content Coding Extensions", vol. 6, Issue 4, pp. 409-419.IEEE Journal on Emerging and Selected Topics in Circuits and Systems.

Rajan Joshi et al. "Screen content coding test model 1 (SCM 1)" , JCTVC-Q1014, Valencia, Spain.

Xiaozhong Xu et al. "Block vector prediction for intra block copying in HEVC screen content coding", p. 273-282, 2015 Data Compression Conference.

Xiaozhong Xu et al. "Intra block copy in Versatile Video Coding with Reference Sample Memory Reuse",2019 Picture Coding Symposium (PCS).

Chun-Chi Chen et al. "Screen Content Coding Using Non-Square Intra Block Copy for HEVC", Jul. 2014, 2014 IEEE International Conference on Multimedia and Expo (ICME), Chengdu, China.

Yingbin WANG et al. "Intra Block Copy in AVS3 Video Coding Standard", Jul. 2020, 2020 IEEE International Conference on Multimedia & Expo Workshops (ICMEW), London, UK.

Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 2.

Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 3.

The European Patent Office (EPO) The Extended European Search Report for 21857559.5, Aug. 30, 2023 15 Pages (including translation).

Wang Yingbin et al:"Low Complexity Implementation of Intra String Copy in Avs3",2021 IEEE International Conference on Multimedia & Expo Workshops (ICMEW) , IEEE,Jul. 5, 2021 (Jul. 5, 2021) , pp. 1-4, XP034121420, DOI: 10.1109/ICMEW53276.2021.9456015.

* cited by examiner

VIDEO DECODING METHOD AND APPARATUS, VIDEO CODING METHOD AND APPARATUS, DEVICE, AND STORAGE MEDIUM

RELATED APPLICATIONS

This application is a continuation application of PCT Application No. PCT/CN2021/112133, filed on Aug. 11, 2021, which in turn claims priority to Chinese Patent Application No. 202010841108.9, entitled "VIDEO DECODING METHOD AND APPARATUS, VIDEO CODING METHOD AND APPARATUS, DEVICE, AND STORAGE MEDIUM" filed on Aug. 20, 2020. The two applications are both incorporated herein by reference in their entirety.

FIELD OF THE TECHNOLOGY

Embodiments of this application relate to the field of video coding and decoding technologies, and in particular, to a video decoding method and apparatus, a video coding method and apparatus, a device, and a storage medium.

BACKGROUND OF THE DISCLOSURE

In current video coding and decoding standards, such as versatile video coding (VVC) and audio video coding standard 3 (AVS3), an intra string copy (ISC) technique is introduced.

In the related ISC technique, a coding block is partitioned into a series of pixel strings or unmatched pixels in a scanning order. Essentially, the coding block is allowed to be partitioned into pixel strings with any integer pixel length. For example, an unmatched pixel may be considered as a pixel string with a length of 1. Accordingly, the length of the pixel string may be any positive integers such as 1, 2, 3, and 4.

However, when coding and decoding are performed based on the pixel string obtained through the above division, a problem of low coding and decoding efficiency exists.

SUMMARY

Embodiments of this application provide a video decoding method and apparatus, a video coding method and apparatus, a device, and a storage medium, which may improve coding and decoding efficiency of a pixel string. The technical solutions are as follows.

One aspect of the embodiments of this application provides a video decoding method. The method is performed by a decoder-end device and includes decoding, from a bit stream, a binary symbol string with string length information of a current string, the string length information comprising information related to a string length of the current string; inversely binarizing the binary symbol string according to a string length resolution (SLR) of the current string, to obtain the string length information; and determining the string length of the current string according to the string length information.

Another aspect of the embodiments of this application provides a non-transitory computer-readable storage medium, storing at least one instruction, at least one program, a code set, or an instruction set, the at least one instruction, the at least one program, the code set, or the instruction set being loaded and executed by a processor to implement the foregoing video coding method.

By using the SLR as a basis for division and coding and decoding of pixel strings, a length of the pixel string in a coding/decoding block may be limited to a multiple of the SLR, which improves uniformity of the pixel strings, so that a codec end can perform coding and decoding under a condition of memory alignment, thereby improving coding and decoding efficiency of the pixel string.

In addition, in view of impact of the SLR on coding and decoding of the string length information, this application provides methods for binarizing and inversely binarizing the string length information according to the SLR. The methods improve the coding and decoding methods of the string length information under different SLRs. Specifically, when a coder end binarizes a value of the string length information, the value may be compressed by using the SLR, and then the compressed value (that is, a quotient obtained by dividing the value by the SLR) is binarized instead of directly binarizing the value. Correspondingly, when a decoder end performs inverse binarization, the compressed value is restored through inverse binarization, and then the value of the string length information is obtained based on the compressed value and the SLR (that is, by multiplying the compressed value by the SLR). Accordingly, the number of characters required for binarization representation can be reduced, which can reduce complexity of coding and decoding and help improve coding and decoding performance.

DESCRIPTION OF EMBODIMENTS

To make objectives, technical solutions, and advantages of this application clearer, the following further describes implementations of this application in detail with reference to the accompanying drawings.

Figure 1:
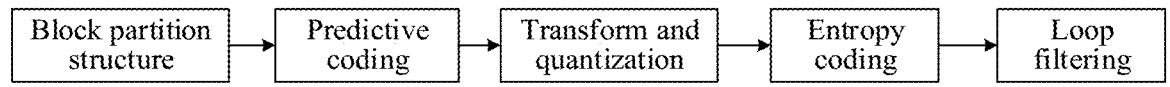
FIG. 1 is a flowchart of a video coding process shown in this application.

Before embodiments of this application are described, a video coding technology is briefly described with reference to FIG. 1. FIG. 1 exemplarily shows a basic flowchart of a video coding process.

A video signal is an image sequence including a plurality of frames. The frame is a representation of spatial information of the video signal. For example, in a YUV mode, a frame includes one luminance sample matrix (Y) and two chroma sample matrices (Cb and Cr). From a perspective of an obtaining method of a video signal, the obtaining method may be divided into two methods: camera capturing and computer generation. Due to different statistical characteristics, a corresponding compression coding method may also differ.

In some video coding technologies, such as an H.265/high efficiency video coding (HEVC) standard, an H.266/versatile video coding (VVC) standard, and an audio video coding standard (AVS) (such as an AVS3), a hybrid coding framework is adopted to perform the following series of operation and processing on an inputted original video signal.

1. Block partition structure: An inputted image is partitioned into a plurality of non-overlapping to-be-processed units, and similar operations are performed on all of the to-be-processed units. The processing unit is referred to as a coding tree unit (CTU) or a largest coding unit (LCU). The CTU may be further partitioned to obtain one or more basic coding units, which are referred to as Cus. Each CU is the most basic element in an encoding process. Various possible encoding modes for each CU are described below.

2. Predictive coding: The predictive coding includes modes such as intra prediction and inter prediction. After an original video signal is predicted by using a selected reconstructed video signal, a residual video signal is obtained. A coder end is required to select a most suitable one from numerous possible predictive coding modes for a current CU, and inform a decoder end. The intra prediction means that a predicted signal comes from a region in a same image that has been coded and reconstructed. The inter prediction means that a predicted signal comes from another coded image (referred to as a reference image) that is different from a current image.

3. Transform & quantization: After a transform operation such as discrete Fourier transform (DFT) or discrete cosine transform (DCT) is performed on a residual video signal, the signal is converted to a transform domain, which is referred to as a transform coefficient. A lossy quantization operation is further performed on the signal in the transform domain, which loses a specific amount of information, so that the quantized signal is conducive to compressed expression. In some video coding standards, more than one transform mode may be selected. Therefore, the coder end is also required to select one transform mode for the current CU and inform the decoder end. The fineness of quantization is generally determined by a quantization parameter (QP). A larger QP indicates that coefficients within a larger value range are to be quantized into a same output, which usually brings larger distortion and a lower bit rate. Conversely, a smaller value of the QP represents that coefficients within a smaller range will be quantized as a same output, and therefore, may usually bring a smaller distortion while corresponding to a higher bit rate.

4. Entropy coding or statistical coding: Statistical compression coding is performed quantized transform domain signals according to frequencies of occurrence of values, and finally, a binarized (0 or 1) compressed bitstream is outputted. In addition, other information such as a selected mode and a motion vector is generated through encoding, and entropy coding is also needed to reduce a code rate. Statistical coding is a lossless coding mode that can effectively reduce a bit rate required for expressing a same signal. Common statistical coding modes include Variable Length Coding (VLC) or Content Adaptive Binary Arithmetic Coding (CABAC).

5. Loop filtering: Operations of inverse quantization, inverse transform, and prediction compensation (reverse operations of the foregoing operations 2 to 4) are performed on an image that has been encoded, to obtain a reconstructed decoded image. Compared with an original image, a reconstructed image has some information different from that of the original image due to impact of quantization, resulting in a distortion. The reconstructed image is filtered, for example, by using a filter such as a deblocking filter, a sample adaptive offset (SAO) filter, or an adaptive lattice filter (ALF) filter, which can effectively reduce the distortion caused by the quantization. Because the filtered reconstructed image is used as a reference for subsequently encoding an image and is used for predicting a future signal, the foregoing filtering operation is also referred to as loop filtering, that is, a filtering operation in an encoding loop.

It can be seen from the above coding process that, on the decoder end, for each CU, after a decoder obtains a compressed bit stream, entropy decoding is first performed to obtain all kinds of mode information and quantized transform coefficients. Inverse quantization and inverse transform are performed on the coefficients, to obtain a residual signal. On the other hand, a predicted signal corresponding to the CU may be obtained according to the known encoding mode information, and a reconstructed signal can be obtained by adding the residual signal and the predicted signal. Finally, a loop filtering operation needs to be performed on a reconstructed value of the decoded image before a final output signal is generated.

In some mainstream video coding standards such as the HEVC, the VVC, and the AVS3, a block-based hybrid coding framework is adopted. Original video data is partitioned into a series of coding blocks by using the standards, and the video data is compressed by using video coding methods such as prediction, transform, and entropy coding. Motion compensation is a prediction method commonly used for video coding, which is to derive a predicted value of a current coding block from a coded region based on a redundancy attribute of video content in a time domain or a spatial domain. Such prediction method includes inter prediction, intra block copy (IBC) prediction, intra string copy (ISC) prediction, and the like. During specific coding implementation, these prediction methods may be used alone or in combination. For a coding block using these prediction methods, it is usually necessary to explicitly or implicitly code one or more two-dimensional displacement vectors in a bit stream, Ih indicates displacement of a current block (or a co-located block of the current block) relative to one or more reference blocks of the current block.

In different prediction modes and different implementations, the displacement vector may have different names. In this specification, 1) the displacement vector in the inter prediction mode is referred to as a motion vector (MV for short), 2) the displacement vector in the IBC prediction mode is referred to as a block vector (BV for short), and 3) the displacement vector in the ISC prediction mode is referred to as a string vector (SV for short). The ISC is also referred to "as "string predic"io"", "string matc"ing", or the like.

The MV is the displacement vector used in the inter prediction mode, which points from a current image to a reference image, and a value of the vector is a coordinate offset between a current block and a reference block. The current block and the reference block are in two different images. In the inter prediction mode, motion vector prediction may be introduced. Through prediction of a motion vector of the current block, a predicted motion vector corresponding to the current block is obtained. A difference between the predicted motion vector corresponding to the current block and an actual motion vector is coded and transmitted. Compared with directly coding and transmission of the actual motion vector corresponding to the current block, bit overheads can be reduced. In the embodiment of this application, the predicted motion vector is a predicted value of the motion vector of the current block obtained through a motion vector prediction technique.

The BV is the displacement vector used in the IBC prediction mode, and a value of the vector is a coordinate offset between the current block and the reference block. The current block and the reference block are in the current image. In the IBC mode, BV prediction may be introduced. Through prediction of a BV of the current block, a predicted BV corresponding to the current block is obtained. A difference between the predicted BV corresponding to the current block and an actual BV is coded and transmitted. Compared with directly coding and transmission of the actual BV corresponding to the current block, bit overheads can be reduced. In the embodiment of this application, the predicted BV is a predicted value of the BV of the current block obtained through a BV prediction technique.

The SV is the displacement vector used in the ISC prediction mode, and a value of the vector is a coordinate offset between a current string and a reference string. The current string and the reference string are in the current image. In the ISC mode, string vector prediction may be introduced. Through prediction of a string vector of the current string, a predicted string vector corresponding to the current string is obtained. A difference between the predicted string vector corresponding to the current string and an actual string vector is coded and transmitted. Compared with directly coding and transmission of the actual string vector corresponding to the current string, bit overheads can be reduced. In the embodiment of this application, the predicted string vector is a predicted value of the string vector of the current string obtained through a string vector prediction technique.

Different prediction modes are described below.

I. Inter Prediction Mode

Figure 2:
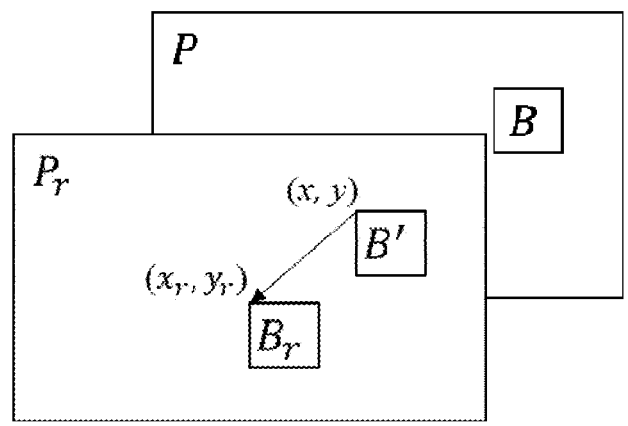
FIG. 2 is a schematic diagram of an inter prediction mode according to an embodiment of this application.

As shown in FIG. 2, the inter prediction is to predict, through correlation of a video in a time domain, a pixel of a current image by using a pixel of an adjacent coded image, so as to effectively remove redundancy of the video in the time domain, thereby effectively saving bits for coding residual data. P is a current frame, Pr is a reference frame, B is a current to-be-coded block, and Br is a reference block of B. Coordinates 'f B' and B in the image are at the same location, coordinates of Br are (xr, yr), and coordinates 'f B' are (x, y). Displacement between the current to-be-coded block and the reference block of the current to-be-coded block is referred to as a motion vector (MV), that is:

$$MV=(xr-x,yr-y).$$

In view of a strong correlation between adjacent blocks in the time domain or the spatial domain, bits required to code the MV may be further reduced by using an MV prediction technique. In the H.265/HEVC, the inter prediction includes two MV prediction technologies: merge and advanced motion vector prediction (AMVP).

In the merge mode, a candidate MV list is established for a current prediction unit (PU), which includes 5 candidate MVs (and reference images corresponding to the MVs). The five candidate MVs are traversed to select an optimal MV having the smallest rate-distortion cost. When a codec establishes a candidate list in a same way, a coder is only required to transmit an index of the optimal MV in the candidate list. The MV prediction technique of the HEVC further has a skip mode, which is a special case of the merge mode. After the optimal MV is found in the merge mode, if the current block is substantially the same as the reference block, residual data is not required to be transmitted and only the index of the MV and a skip flag are required to be transmitted.

Figure 3:
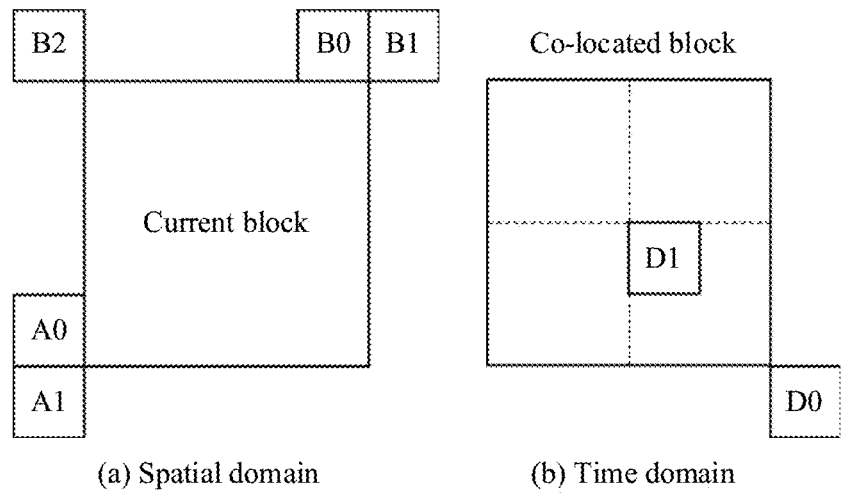
FIG. 3 is a schematic diagram of a candidate motion vector according to an embodiment of this application.

The candidate MV list established in the merge mode includes a list in a spatial domain and a list in a time domain, and further includes a combination of lists for a B slice (a B-frame image). A maximum of four candidate MVs are provided in the spatial domain. The established candidate MVs are shown in (a) of FIG. 3. The list in the spatial domain is established in a sequence of A1→B1→B0→A0→B2, where B2 is an alternative. That is, when one or more of A1, B1, B0, or A0 do not exist, motion information of the B2 is required to be used. A maximum of one candidate MV is provided in the time domain. The established candidate MV is shown in (b) of FIG. 3, which is obtained by scaling an MV of a co-located PU by using the following formula:

$$curMV=td*colMV/tb;$$

curMV represents an MV of the current PU, colMV represents an MV of the co-located PU, td represents a distance between the current image and the reference image, and tb represents a distance between a co-located image and the reference image. When a PU at a location D0 on the co-located block is unavailable, the PU is replaced with a co-located PU at a location D1. For the PU in the B slice, since there are two MVs, the candidate MV list is also required to provide two motion vector predictors (MVP). A combined list for the B slice is generated by combining first four candidate MVs in the candidate MV list in pairs by the HEVC.

Similarly, an AMVP mode establishes the candidate MV list for the current PU by using MV correlation of adjacent blocks in the spatial domain and the time domain. Different from the merge mode, in the AMVP mode, an optimal predicted MV is selected from the candidate MV list, and a difference between the optimal predicted MV and an optimal MV obtained for the current to-be-coded block through motion search is coded, that is, MVD=−MV−MVP is coded. The MVD is a motion vector difference. By establishing the same list, the decoder end requires only serial numbers of the MVD and the MVP in the list for calculating an MV of the current decoding block. A candidate MV list in the AMVP mode also includes a list in the spatial domain and a list in the time domain, except that a length of the candidate MV list in the AMVP mode is only 2.

As described above, in the AMVP mode of the HEVC, the MVD is required to be coded. In the HEVC, a resolution of the MVD is controlled by use_integer_mv_flag in slice_header. When a value of the flag is 0, the MVD is coded wit¼ ¼ (luminance) pixel resolution. When the value of the flag is 1, the MVD is coded with an integer (luminance) pixel resolution. In the VVC, an adaptive motion vector resolution (AMVR for short) method is used. The method allows adaptively selecting a resolution for coding a MV for each CU. In the ordinary AMVP mode, resolutions such as a ¼ ¼-pixel resolution½ ½-pixel resolution, a 1-pixel resolution, or a 4-pixel resolution may be selected. For a CU having at least one non-zero MVD component, a flag is first coded to indicate whether a quarter luminance sample MVD precision is used for the CU. When the flag is 0, the MVD of the current CU is coded with ¼ ¼-pixel resolution.

Otherwise, a second flag is required to be coded to indicate that ½ ½-pixel resolution or another MVD resolution is used for the CU. Otherwise, a third flag is coded to indicate whether the 1-pixel resolution or the 4-pixel resolution is used for the CU.

II. IBC Prediction Mode

Figure 4:
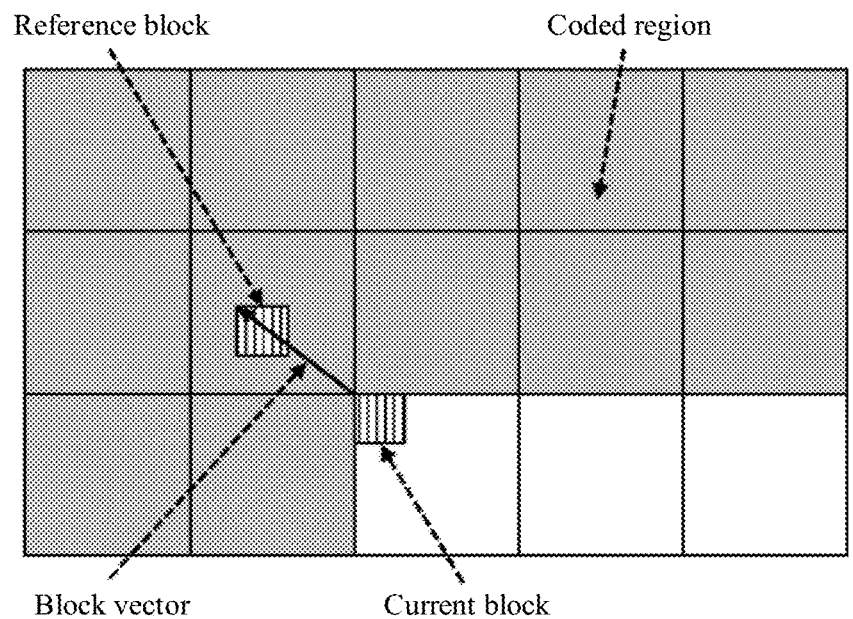
FIG. 4 is a schematic diagram of an intra block copy (IBC) mode according to an embodiment of this application.

IBC is an intra coding tool adopted in screen content coding (SCC for short) extension of the HEVC, which significantly improves coding efficiency of screen content. The AVS3 and the VVC also adopts the IBC technique to improve performance of the SCC. The IBC is to predict a pixel of a current to-be-coded block through correlation of a screen content video in the spatial domain by using a coded image pixel on a current image, which can effectively save bits required for coding pixels. As shown in FIG. 4, in the IBC, displacement between a current block and a reference block is referred to as a BV. The H.266/VVC adopts the BV prediction technique, which is similar to the inter prediction, to further save bits required for coding the BV, and allows coding a block vector difference (BVD) by using the 1-pixel resolution or the 4-pixel resolution.

III. ISC Prediction Mode

Figure 5:
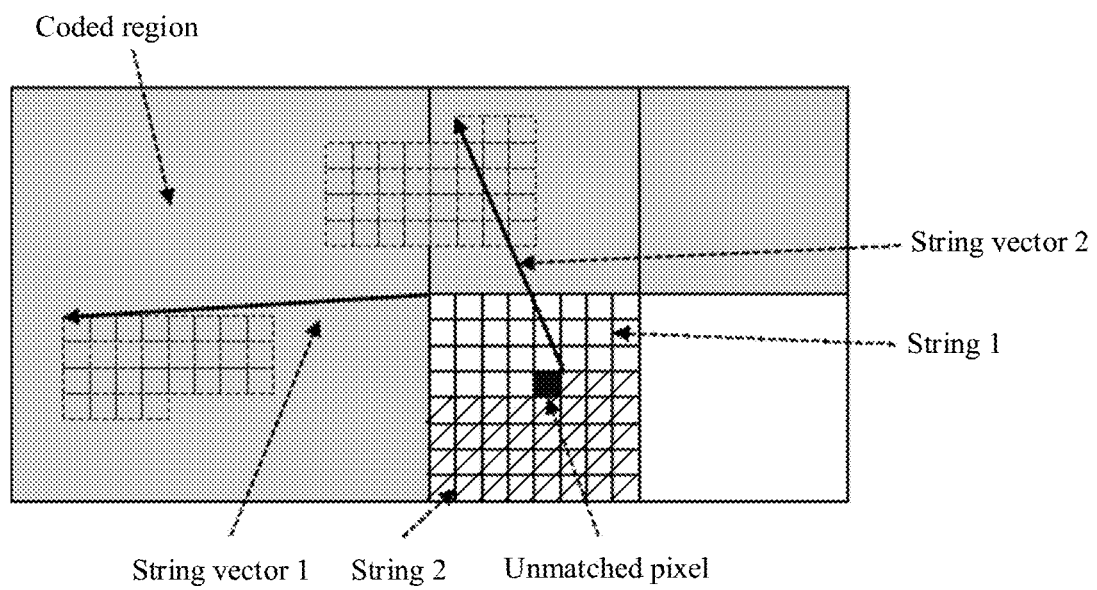
FIG. 5 is a schematic diagram of an intra string copy (ISC) mode according to an embodiment of this application.

In the ISC technique, a coding block is partitioned into a series of pixel strings or unmatched pixels in a certain scan order (such as raster scan, back/forward scan, or zigzag scan). Similar to the IBC, in this mode, for each string, a coded region of the current image is searched for a reference string having a same shape, to derive a predicted value of the current string, and a difference between a pixel value and the predicted value of the current string is coded rather than directly coding the pixel value, which can effectively save bits. FIG. 5 shows a schematic diagram of ISC. A dark gray region is a coded region, 28 white pixels represent a string 1, 35 light gray pixels represent a string 2, and one black pixel represents an unmatched pixel. Displacement between the string 1 and a reference string of the string is a string vector 1 in FIG. 4. Displacement between the string 2 and a reference string of the string is a string vector 2 in FIG. 4.

In the ISP technique, an SV and a string length corresponding to each string in the current coding block and a flag indicating whether there is a matched string are required to be coded. The SV represents displacement between a to-be-coded string and a reference string of the to-be-coded string. The string length indicates a number of pixels included in the string. In different implementations, the string length may be coded in different methods. Examples are provided below (some of the examples may be used in combination): 1) A length of a string is directly coded in a bit stream. 2) A number of subsequent to-be-processed pixels of the string is coded in the bit stream, and the decoder end calculates the length of the current string according to a size N of the current block, a number N1 of processed pixels, and a number N2 of to-be-processed pixels obtained by decoding, that is, L−N−N1−N2. 3) A flag is coded in the bit stream to indicate whether the string is the last string. If the string is the last string, the length of the current string is calculated according to the size N of the current block and the number N1 of processed pixels, that is, L−N−N1. If no corresponding reference is found from a reference region for a pixel, a pixel value of the unmatched pixel is directly coded.

In the 73$^{rd}$ meeting of the AVS Workgroup in June 2020, a string prediction technology was incorporated into the standard. A decoding process of the string prediction in a current solution is as follows (a bold field with an underline represents a syntax element required to be decoded, a field with a first letter being capitalized and without an underline represents a variable, and a value of the variable may be obtained by decoding of a syntax element. The following process omits details unrelated with this application):

```
isc_cu_coding (x0, y0, width, height, component) {  // it is a decoding process of isc cu
    NumCodedPixel = 0          //it is a number of decoded pixels
    NumTotalPixel = width * height   //it is a total number of pixels
    i = 0
    While (NumCodedPixel < NumTotalPixel) {
        StrXInCu=TravScan[Log(width)−2][Log(height)−2] [NumCodedPixel][0]
        StrYInCu=TravScan[Log(width)−2][Log(height)−2] [NumCodedPixel][1]
        isc_match_type_flag[i] // it is a flag indicating whether a decoded i$^{th}$ part         ae(v)
matches, a value of 0 means that the i$^{th}$ part is an unmatched pixel, and 1 represents a
string
        if(IscMatchTypeFlag[i] == 1) {   // if the i$^{th}$ part is a string
            next_remaining pixel_in_cu [i]   // a next remaining pixel number is        ae(v)
decoded, and the remaining pixel number means a number of pixels in a current coding unit
that have not been decoded after the i$^{th}$ part of the current coding unit is decoded
            StrLen[i] = NumTotalPi−el − NumCodedPi−el − NumRemainingPixelInCu−
i] − 1
        }
        decode_sv( )  // a string vector is decoded, and the specific process is omitted  ae(v)
herein
        NumCodedPixel += StrLen[i]
    }
    else {     // if the i$^{th}$ part is an unmatched pixel
        isc_unmatched_pixel_y[i]  // a Y component of the unmatched pixel is           u(10)
decoded
        if (component'== 'COMPONENT_LUMACH'OMA' && !(StrXInCu & 0x1 ||
StrYInCu & 0x1)) {
            isc_unmatched_pixel_u[i] // a U component of the unmatched pixel is u(10)
decoded
            isc_unmatched_pixel_v[i] // a V component of the unmatched pixel is u(10)
decoded
        }
        NumCodedPixel += 1
    }
    i ++
    IscPartNuI = i  // there are IscPartNum parts in total
}
```

Related Semantic Description:

1. Match type flag in ISC prediction: isc_match_type_flag[i]

Binary variable: A valu ' 'f'1' indicates that the $i^{th}$ part of the current CU is a string, and a valu ' 'f'0' indicates that the $i^{th}$ part of the current CU is an unmatched pixel. IscMatchTypeFlag[i] is equal to the value of isc_match_type_flag[i]. If isc_match_type_flag[i] does not exist in a bit stream, the value of IscMatchTypeFlag[i] is 0.

2. Last flag in ISC prediction: isc_last_flag[i]

Binary variable: A valu ' 'f'1' indicates that the $i^{th}$ part of the current CU is the last part of the current CU, and a length StrLen[i] of the part is equal to NumTotalPixel-NumCodedPixel, and a valu ' 'f'0' indicates that the $i^{th}$ part of the current CU is not the last part of the current CU, and the length StrLen[i] of the part is equal to NumTotalPixel-NumCodedPixel-NumRemainingPixelMinus1[i]-1. The IscLastFlag[i] is equal to the value of isc_last_flag[i].

3. Next remaining pixel number: next_remaining_pixel_in_cu[i]

A value of next_remaining_pixel_in_cu[i] represents a number of remaining pixels in the current coding unit that have not been decoded after the $i^{th}$ part of the current coding unit is decoded. A value of NextRemainingPixelInCu[i] is equal to the value of next_remaining_pixel_in_cu[i].

4. Value of the Y component of the unmatched pixel in ISC prediction: isc_unmatched_pixel_y[i]

Value of the U component of the unmatched pixel in ISC prediction: isc_unmatched_pixel_u[i]

Value of the V component of the unmatched pixel in ISC prediction: isc_unmatched_pixel_v[i]

A 10-digit unsigned integer is the value of the Y component, a Cb component, or a Cr component of the unmatched pixel of the $i^{th}$ part of the current CU. IscUnmatchedPixelY[i], IscUnmatchedPixelU[i], and IscUnmatchedPixelV[i] are respectively equal to the values of isc_unmatched_pixel_y[i], isc_unmatched_pixel_u[i], and isc_unmatched_pixel_v[i].

In order to cause the coder end to learn the string length of the current string, the coder end is required to code string length information of the current string (including information related to the string length, such as the syntax element next_remaining_pixel_in_cu described above). During the coding, the coder end binarizes the string length information of the current string to obtain a corresponding binary symbol string and then adds the binary symbol string to the bit stream, and the bit stream with the binary symbol string is transmitted to the decoder end. Correspondingly, during decoding of the string length of the current string, the decoder end acquires the above binary symbol string from the bit stream, and then inversely binarizes the binary symbol string to obtain the string length information of the current string, so as to further determine the string length of the current string accordingly.

Next, the inverse binarization method of the string length information in the AVS3 standard is described.

1. Inverse Binarization Method by Using a Truncated Unary Code

A value of synElVal is obtained from the binary symbol string according to Table 1 (that is, the value restored through inverse binarization).

TABLE 1

Relationship between the synElVal and the binary symbol string (the truncated unary code)

| synElVal | Binary symbol string | | | | | | |
|---|---|---|---|---|---|---|---|
| 0 | 1 | | | | | | |
| 1 | 0 | 1 | | | | | |
| 2 | 0 | 0 | 1 | | | | |
| 3 | 0 | 0 | 0 | 1 | | | |
| 4 | 0 | 0 | 0 | 0 | 1 | | |
| 5 | 0 | 0 | 0 | 0 | 0 | 1 | |
| ... | 0 | 0 | 0 | 0 | 0 | 0 | ... |
| maxVal-1 | 0 | 0 | 0 | 0 | 0 | 0 | ... 1 |
| maxVal | 0 | 0 | 0 | 0 | 0 | 0 | ... 0 |
| binIdx | 0 | 1 | 2 | 3 | 4 | 5 | ... maxVal-1 |

2. Inverse Binarization Method by Using a Unary Code

A value of synElVal is obtained from the binary symbol string according to Table 2 (that is, the value restored through inverse binarization).

TABLE 2

Relationship between the value of synElVal and the binary symbol string (the unary code)

| synElVal | Binary symbol string | | | | | |
|---|---|---|---|---|---|---|
| 0 | 1 | | | | | |
| 1 | 0 | 1 | | | | |
| 2 | 0 | 0 | 1 | | | |
| 3 | 0 | 0 | 0 | 1 | | |
| 4 | 0 | 0 | 0 | 0 | 1 | |
| 5 | 0 | 0 | 0 | 0 | 0 | 1 |
| ... | | | | | | |
| binIdx | 0 | 1 | 2 | 3 | 4 | 5 |

3. Inverse binarization method for next_remaining_pixel_in_cu

If NumTotalPixe_l-NumCodedPixel is equal to 1, next_remaining_pixel_in_cu does not exist in a bit stream, and the value of NextRemainingPixelInCu is 0. Otherwise (that is, the NumPixelInCu-NumCodedPixel is greater than 1), the inverse binarization method for next_remaining_pixel_in_cu is as follows.

A binary symbol string of next_remaining_pixel_in_cu is formed by three parts.

A first step is performing inverse binarization on a first part. First, maxValPrefix is calculated according to the following method:

```
if((NumTotalPixel- NumCodedPixel) <= 5) maxValPrefix = 1
else if((NumTotalPixel- NumCodedPixel) <= 21) maxValPrefix = 2
else if((NumTotalPixel- NumCodedPixel) <= 277) maxValPrefix = 3
else maxValPrefix = 4
``` maxValPrefix is an index of a value range to which the maximum value of a parameter (in this example, that is, next_remaining_pixel_in_cu) that is required to be restored through inverse binarization belongs.

The value of synElVal is obtained from the first part and maxVal=maxValPrefix by looking up Table 1, and a is set to be equal to the value of synElVal.

If a is equal to 0, a second part and a third part do not exist in the bit stream, and the value of next_remaining_pixel_in_cu is 0 (then the string length of the current string is NumTotalPixel-NumCodedPixel). Otherwise (that is, a is greater than 0), a next step is performed.

A second step is inversely binarizing the second part. First, maxValInfix is calculated according to the following method:

```
if(a == 1) {
    d = 1
    maxValInfix = Min(NumTotalPixel- NumCodedPixel- 2,3)
}
else if(a == 2) {
    d = 5
    maxValInfix = Min(NumTotalPixel- NumCodedPixel- 6,15)
}
else if(a == 3) {
    d = 21
    maxValInfix = Min(NumTotalPixel- NumCodedPixel- 22,255)
}
else {
    d = 277
    maxValInfix = NumTotalPixel- NumCodedPixel- 278
}
```

Second, n=Ceil(Log(maxValInfix+1)) is calculated. Then, a value b of synElVal is obtained from the second part and len=n−1 by looking up Table 3. When len<1, the binary symbol string is empty (that is, the binary symbol string does not actually exist in the bit stream, so there is no need to parse the bit stream).

TABLE 3

Relationship between the synElVal and the binary symbol string (a fixed-length code having a length of len)

| Value of synElVal | Binary symbol string | | | | |
|---|---|---|---|---|---|
| 0 | 0 | 0 | ... | 0 | 0 |
| 1 | 0 | 0 | ... | 0 | 1 |
| 2 | 0 | 0 | ... | 1 | 0 |
| 3 | 0 | 0 | ... | 1 | 1 |
| ... | | | ... | | |
| $2^{len}-4$ | 1 | 1 | ... | 0 | 0 |
| $2^{len}-3$ | 1 | 1 | ... | 1 | 0 |
| $2^{len}-2$ | 1 | 1 | ... | 1 | 0 |
| $2^{len}-1$ | 1 | 1 | ... | 1 | 1 |
| binIdx | 0 | 1 | ... | len−2 | len−1 |

A third step is inversely binarizing the third part. If b is less than $2^n$−maxValInfix−1 or maxValInfix is equal to 0, a value of k is set to 0. Otherwise, the value of k is set to 1. Then, a value c of the synElVal is obtained from the third part and len=k by looking up Table 3.

Finally, the value of next_remaining_pixel_in_cu is calculated from the values of d, b, c, k, n, and maxValInfix according to the following method:

next_remaining_pixel_in_cu=d+(b<<k)−+c−($2^n$−maxValInfix−1)×k.

For the coder end, the binarization process of next_remaining_pixel_in_cu is mainly as follows.

1. A series of value ranges (such as including ranges 1, 2, . . . , N) is determined according to the maximum number of remaining pixels max_remaining_pixel_in_cu, and an index of the range where the value of next_remaining_pixel_in_cu is located is recorded. The index is set to 0 when next_remaining_pixel_in_cu is equal to 0. The index value is denoted as a first part of the string length.

2. max_remaining_pixel_in_cu minus a starting value of a group where max_remaining_pixel_in_cu is located is denoted as maxValInfix, n=Ceil(Log(maxValInfix+1)) is calculated, and next_remaining_pixel_in_cu minus a starting value of a group where next_remaining_pixel_in_cu is located is denoted as valInfix. Then, valInfix is partitioned into a second part and a third part for coding (a specific step is omitted herein) according to values of n and $2^n$−maxValInfix−1.

In the current ISC solution, the SLR is one pixel, and the CU is allowed to be partitioned into substrings having any integer pixel length (that is, an allowable string length for coding may be 1, 2, 3, . . . ). In the solution, the CU may be partitioned into pixel strings of a finer granularity, and locations of the pixel strings may not be aligned with a memory, which results in frequent memory access during pixel string reconstruction, thus affecting coding efficiency. For example, assuming that a memory unit can process data corresponding to 4 pixels in parallel, if the string length of the current string is 7, data corresponding to the pixels in the current string is allocated to two or three memory units. In this case, the decoder end is required to access the memory units twice or 3 times to complete decoding of the current string.

In order to improve the uniformity of the pixel strings and the decoding efficiency of the pixel strings, this application provides a video decoding method and a video coding method. By using the SLR as a basis for division and coding and decoding of pixel strings, a length of the pixel string in a coding/decoding block may be limited to a multiple of the SLR, which improves uniformity of the pixel strings, so that a codec end can perform coding and decoding under a condition of memory alignment, thereby improving coding and decoding efficiency of the pixel string. For example, assuming that the memory unit may simultaneously process data corresponding to 4 pixels in parallel, and the SLR is correspondingly set to 4, the length of the pixel string can only be an integer multiple of 4, and there will be no misalignment with the memory unit. Assuming that the string length of the current string is 8, the data of the pixels in the current string may be only stored in and completely occupy two memory units, and are unlikely to be allocated to three memory units, which may cause the decoder end to access the memory unit one more time.

Further, in view of impact of the SLR on coding and decoding of the string length information, this application provides methods for binarizing and inversely binarizing the string length information according to the SLR. The methods improve the coding and decoding methods of the string length information under different SLRs. Specifically, when a coder end binarizes a value of the string length information, the value may be compressed by using the SLR, and then the compressed value (that is, a quotient obtained by dividing the value by the SLR) is binarized instead of directly binarizing the value. Correspondingly, when a decoder end performs inverse binarization, the compressed value is restored through inverse binarization, and then the value of the string length information is obtained based on the compressed value and the SLR (that is, by multiplying the compressed value by the SLR). Accordingly, a number of characters required for binarization representation can be reduced, which can reduce complexity of coding and decoding and help improve coding and decoding performance.

Figure 6:
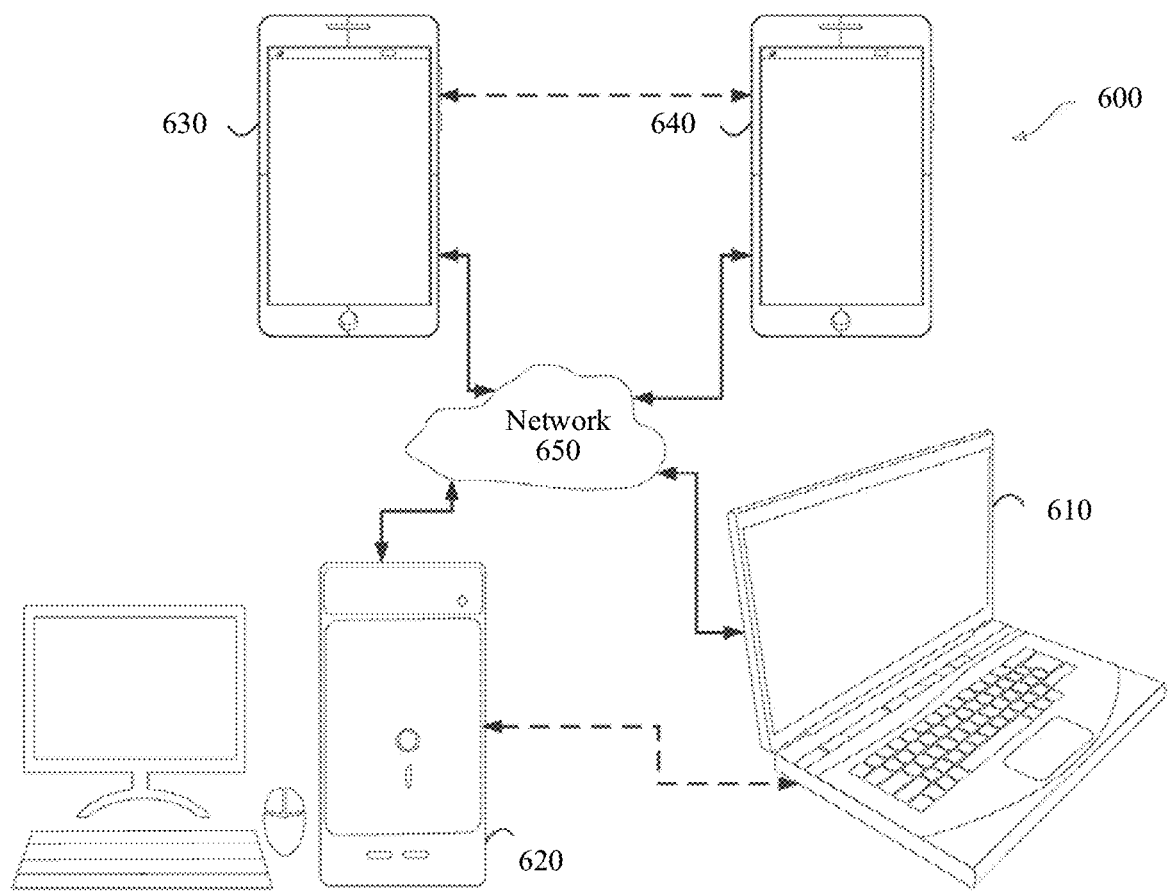
FIG. 6 is a simplified block diagram of a communication system according to an embodiment of this application.

FIG. 6 shows a simplified block diagram of a communication system according to an embodiment of this application. The communication system 600 includes a plurality of devices. The devices may communicate with each other through a network 650, for example. For example, the communication system 600 includes a first device 610 and a second device 620 connected to each other through the network 650. In an embodiment of FIG. 6, the first device 610 and the second device 620 perform one-way data transmission. For example, the first device 610 may be configured to code video data, for example, a video picture stream captured by the first device 610, so as to transmit the coded video data to the second device 620 through the network 650. The coded video data is transmitted in a form of one or more coded video bit streams. The second device 620 may be configured to receive coded video data from the network 650, decode the coded video data to restore the video data, and display a video picture according to the restored video data. The one-way data transmission is common in application such as a media service.

In another embodiment, the communication system 600 includes a third device 630 and a fourth device 640 configured to perform bidirectional transmission of the coded video data. The bidirectional transmission may be performed, for example, during a video conference. For the bidirectional data transmission, each of the third device 630 and the fourth device 640 may code the video data (for example, the video picture stream captured by the device), so as to transmit the coded video data to the other of the third device 630 and the fourth device 640 through the network 650. Each of the third device 630 and the fourth device 640 may further receive the coded video data transmitted from the other of the third device 630 and the fourth device 640, and may decode the coded video data to restore the video data, and the video picture may be displayed on an accessible display apparatus according to the restored video data.

In the embodiment of FIG. 6, the first device 610, the second device 620, the third device 630, and the fourth device 640 may be computer devices such as servers, personal computers, smart phones, and the like, but the principles disclosed in this application may not be limited thereto. The embodiments of this application are applicable to a personal computer (PC), a mobile phone, a tablet computer, a media player, and/or a dedicated video conference device. The network 650 represents any number of networks through which the coded video data is transmitted among the first device 610, the second device 620, the third device 630, and the fourth device 640, which includes, for example, a wired network and/or a wireless communication network. The communication network 650 may exchange data in a circuit switching channel and/or a packet switching channel. The network may include a telecommunication network, a local area network, a wide area network, and/or the Internet. For the purpose of this application, unless explained below, an architecture and a topology of the network 650 may be inessential to the operation disclosed in this application.

Figure 7:
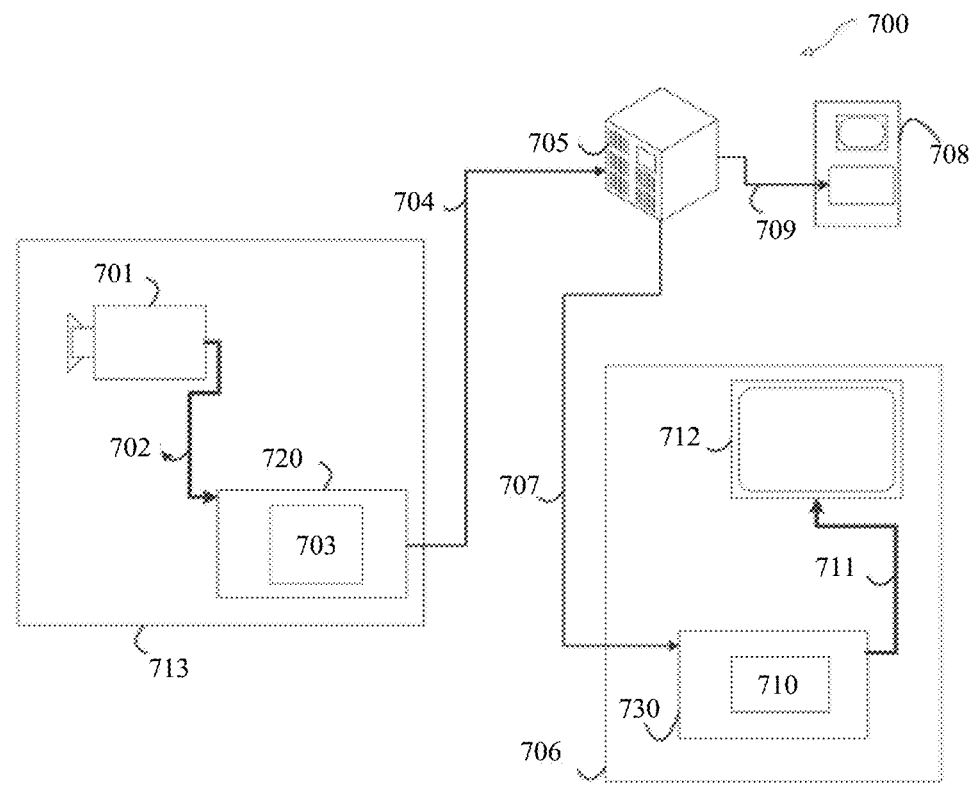
FIG. 7 is a schematic diagram of a placement method of a video coder and a video decoder in a streaming transmission environment exemplarily shown in this application.

As an embodiment, FIG. 7 shows a placement method of a video coder and a video decoder in a streaming transmission environment. The subject matter disclosed in this application may be comparably applicable to other video-enabled applications, including, for example, a video conference, a digital TV (television), storage of a compressed video on a digital media including a compact disc (CD), a digital versatile disc (DVD), a memory stick, and the like.

A streaming transmission system may include a collection subsystem 713. The collection subsystem may include a video source 701 such as a digital camera, and the video source creates an uncompressed video picture stream 702. In an embodiment, the video picture stream 702 includes a sample captured by the digital camera. Compared with the coded video data 704 (or a coded video bit stream), the video picture stream 702 is depicted by a thick line to emphasize the video picture stream having a large data volume. The video picture stream 702 may be processed by an electronic device 720. The electronic device 720 includes a video coder 703 coupled to the video source 701. The video coder 703 may include hardware, software, or a combination of hardware and software to realize or implement various aspects of the disclosed subject matter described in more detail below.

Compared with the video picture stream 702, the coded video data 704 (or a coded video bit stream 704) is depicted by a thin line to emphasize the coded video data 704 having a small data volume (or a coded video bit stream 704), which may be stored on a streaming transmission server 705 for future use. One or more streaming transmission client subsystems, for example, a client subsystem 706 and a client subsystem 708 in FIG. 7, may access the streaming transmission server 705 to retrieve a copy 707 and a copy 709 of the coded video data 704. The client subsystem 706 may include, for example, a video decoder 710 in an electronic device 730. The video decoder 710 decodes an incoming copy 707 of the coded video data and generates an output video picture stream 711 that can be presented on a display 712 (such as a display screen) or another presence apparatus (not shown). In some streaming transmission systems, the coded video data 704, the video data 707, and the video data 709 (for example, the video bit stream) may be coded according to some video coding/compression standards.

The electronic device 720 and the electronic device 730 may include other components (not shown). For example, the electronic device 720 may include a video decoder (not shown), and the electronic device 730 may further include a video coder (not shown). The video decoder is configured to decode received coded video data. The video coder is configured to code the video data.

The technical solution provided in the embodiments of this application may be applicable to the H.266/VVC standard, the H.265/HEVC standard, the AVS (such as AVS3), or a next-generation video coding and decoding standard, which is not limited in the embodiments of this application.

In the video decoding method provided in the embodiments of this application, steps may be performed by a decoder-end device. In the video coding method provided in the embodiments of this application, steps may be performed by a coder-end device. In the video decoding process in an ISC mode, a string length of a current string may be obtained by performing decoding by using the decoding solution provided in the embodiment of this application. In the video coding process in the ISC mode, the string length of the current string may be coded by using the coding solution provided in the embodiments of this application. The decoder-end device and the coder-end device may be both computer devices. The computer device is an electronic device having capabilities such as data computing, processing, and storage, such as a PC, a mobile phone, a tablet computer, a media player, a dedicated video conference device, a server, and the like.

In addition, the method provided in this application may be used alone or in combination with other methods in any order. The coder and the decoder based on the method provided in this application may be implemented by one or more processors or one or more integrated circuits. The technical solutions of this application are described by using several embodiments below.

Figure 8:
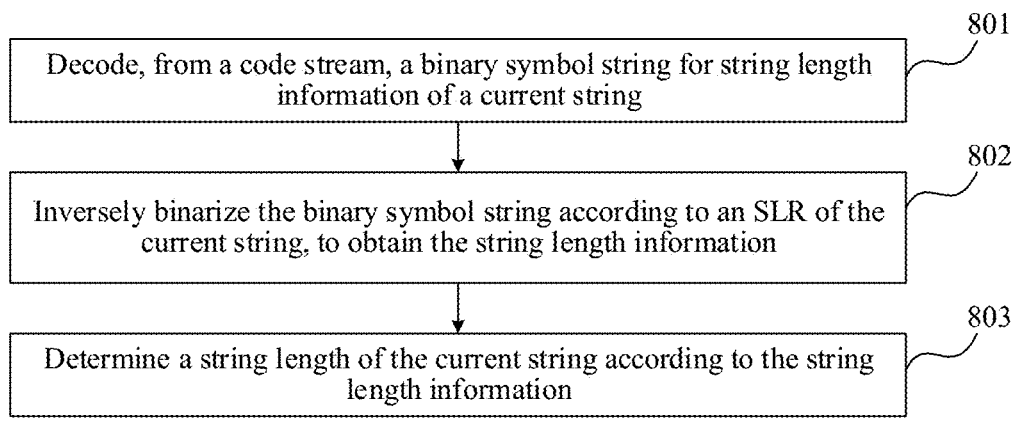
FIG. 8 is a flowchart of a video decoding method according to an embodiment of this application.

FIG. 8 shows a flowchart of a video decoding method according to an embodiment of this application. The method may be applicable to a decoder-end device, that is, the method may be performed by the decoder-end device. The method may include the following steps (801 to 803):

Step 801: Decode, from a bit stream, a binary symbol string for string length information of a current string.

The bit stream is a data stream generated after a video is coded, which may be represented by a series of binary data 0 and 1. In some standards, the bit stream is a binary data stream formed by a coded image.

For a decoding process, the current string is a pixel string that is currently decoded. The pixel string is a pixel sequence composed of a certain number of pixels. In some embodiments, the pixel string is an ordered sequence of data having a finite number of binary bits. In an ISC mode, one CU may be partitioned into a plurality of pixel strings. For video decoding, in order to restore a pixel value of each pixel in the pixel string, a string length of each pixel string needs to be determined first.

The string length information is information related to the string length of the pixel string in the bit stream, and is used for determining the string length of the pixel string. In some embodiments, the string length information of the current string includes information related to the string length of the current string, and is used for determining the string length of the current string.

The binary symbol string for the string length information is one binary string obtained by binarizing the string length information, and characters that may appear in the binary symbol string are only 0 and 1.

Step 802: Inversely binarize the binary symbol string according to a string length resolution (SLR) of the current string, to obtain the string length information.

In the embodiment of this application, impact of the SLR on coding and decoding of the string length information is considered during the inverse binarization. The SLR is a minimum string length by which the CU is partitioned into pixel strings, that is, a minimum allowable string length. For example, the SLR of 4 indicates that the minimum string length of the pixel string is 4. In some embodiments, the SLR may be represented by N, N being a positive integer. In some embodiments, N is an integer greater than 1. When the SLR is N, the string length of the pixel string is an integer multiple of N. For example, the string length of the pixel string may be N, 2N, 3N, 4N, 5N, and so on. For example, when the SLR is 4, the string length of the pixel string may be 4, 8, 12, 16, 20, and so on.

In some embodiments, step 802 may include the following two substeps.

1. Inversely binarize the binary symbol string, to obtain string length information compressed based on the SLR.
2. Determine the string length information according to the compressed string length information and the SLR.

For example, when a coder end binarizes a value of the string length information, the value may be compressed by using the SLR, and then the compressed value (that is, a quotient obtained by dividing the value by the SLR) is binarized instead of directly binarizing the value. Correspondingly, when a decoder end performs inverse binarization, the compressed value is restored through inverse binarization, and then the value of the string length information is obtained based on the compressed value and the SLR (that is, by multiplying the compressed value by the SLR).

In addition, in the embodiments of this application, a plurality of methods of inversely binarizing the binary symbol string are provided, to obtain the string length information compressed based on the SLR. For details, refer to the description in the following embodiments.

Step 803: Determine a string length of the current string according to the string length information.

The string length of the current string is a number of pixels included in the current string.

In one example, the string length information of the current string includes the string length of the current string.

In another example, the string length information of the current string includes a number of remaining pixels in the decoding block to which the current string belongs after the current string is decoded. Then the decoder end may acquire a total number of pixels in the decoding block to which the current string belongs, acquire a number of decoded pixels in the decoding block to which the current string belongs, and then determine the string length of the current string based on the total number of pixels, the number of decoded pixels, and the number of remaining pixels after the current string is decoded. Assuming that the total number of pixels is denoted as M, the number of decoded pixels is denoted as $M_2$, and the number of remaining pixels after the current string is decoded is denoted as $M_1$, the string length of the current string is $L=M-M_1-M_2$.

Based on the above, in the technical solution provided in the embodiments of this application, by using the SLR as a basis for partitioning and coding and decoding of the pixel strings, a length of the pixel string in a coding/decoding block may be limited to a multiple of the SLR, which improves uniformity of the pixel strings, so that a codec end can perform coding and decoding under a condition of memory alignment, thereby improving coding and decoding efficiency of the pixel string.

In addition, in view of impact of the SLR on coding and decoding of the string length information, this application provides methods for binarizing and inversely binarizing the string length information according to the SLR. The methods improve the coding and decoding methods of the string length information under different SLRs. Specifically, when a coder end binarizes a value of the string length information, the value may be compressed by using the SLR, and then the compressed value (that is, a quotient obtained by dividing the value by the SLR) is binarized instead of directly binarizing the value. Correspondingly, when a decoder end performs inverse binarization, the compressed value is restored through inverse binarization, and then the value of the string length information is obtained based on the compressed value and the SLR (that is, by multiplying the compressed value by the SLR). Accordingly, a number of characters required for binarization representation can be reduced, which can reduce complexity of coding and decoding and help improve coding and decoding performance.

A method in which the decoder end determines the SLR of the current string during the decoding is described below. In the embodiments of this application, the following several methods of determining the SLR of the current string are exemplarily provided.

Method I: Determine a first preset value as the SLR of the current string. The foregoing first preset value is a preset value of the SLR. For example, the first preset value may be predefined in a protocol. During decoding of the current string, the decoder end determines the first preset value as the SLR of the current string without needing to acquire the SLR of the current string from the bit stream.

Method II: Decode the SLR of the current string from a sequence header of an image sequence to which the current string belongs. In some standards, the foregoing image sequence, also referred to as a video sequence, is a highest-level syntax structure of a coded bit stream, which includes one or more consecutive coded images. In some embodiments, the image sequence starts with a first sequence header, and a sequence end code or a video editing code indicates an end of an image sequence. The sequence header between the first sequence header of the image sequence and a first sequence end code or the video editing code is a repeated sequence header. In some embodiments, each sequence header is followed by one or more coded images, and each image is to be preceded by an image header. In some embodiments, the coded image is arranged in a bit stream order in the bit stream, and the bit stream order is to be the same as a decoding order. The decoding order may not be the same as a display order. The sequence header of the above image sequence includes some related information for decoding the image sequence. For example, the sequence header of the image sequence may be a special reserved field that defines a bit length and is appended to the front of a corresponding data sequence of the image sequence in the bit stream. In this example, the sequence header of the image sequence further includes the SLR. In some embodiments, the SLRs of strings included in the image sequence to which the current string belongs are the same, which are the SLRs all decoded from the sequence header of the image sequence. In an example, the decoder end decodes one piece of indication information (such as an index, a syntax element, or other indication information) from a sequence header of an image system. The indication information indicates SLRs of all strings in the image sequence.

Method III: Decode the SLR of the current string from an image header of an image to which the current string belongs. The above image is a single image frame in a video. In some standards, one image may be a frame or a field. In some embodiments, the above image is a coded image, and the above coded image is a coded representation of the image. The image header of the above image includes some related information for decoding the image. For example, the image header of the image is a special reserved field that defines the bit length and is appended to the front of a corresponding data sequence of the image in the bit stream. In this example, the image header of the image further includes the SLR. In some embodiments, the SLRs of strings included in the image to which the current string belongs are the same, which are SLRs all decoded from the image header of the image. In an example, the decoder end decodes one pied of indication information (such as an index, a syntax element, or other indication information) from the image header of the image. The indication information indicates SLRs of all strings in the image.

Method IV: Decode the SLR of the current string from a patch header of a patch to which the current string belongs. The foregoing patch is a plurality of adjacent LCUs arranged in a raster scan order. The raster scan means mapping a two-dimensional rectangular raster to a one-dimensional raster. An entry to the one-dimensional grating starts from a first row of the two-dimensional grating, and then a second row, a third row, and so on are scanned. The rows in the raster are scanned from left to right. The patch header of the foregoing patch includes some related information for decoding the image. For example, the patch header of the patch is a special reserved field that defines the bit length and is appended to the front of a corresponding data sequence of the patch in the bit stream. In this example, the patch header of the patch further includes the SLR. In some embodiments, the SLRs of strings included in the patch to which the current string belongs are the same, which are the SLRs all decoded from the patch header of the patch. In an example, the decoder end decodes one piece of indication information (such as an index, a syntax element, or other indication information) from the patch header of the patch. The indication information indicates SLRs of all strings in the patch.

Method V: Decode the SLR of the current string from coding information of the LCU to which the current string belongs. In some standards, the LCU includes an L*L luminance sample block and a corresponding chroma sample block, which are obtained by image partitioning. The coding information of the LCU includes some related information for decoding the LCU. For example, the coding information of the LCU is a special reserved field that defines the bit length and is appended to the front of a corresponding data sequence of the LCU in the bit stream. One LCU may include a plurality of CUs. In this example, the coding information of the LCU further includes the SLR. In some embodiments, The SLRs of strings included in the LCU to which the current string belongs are the same, which are the SLRs all decoded from the coding information of the LCU. In an example, the decoder end decodes one piece of indication information (such as an index, a syntax element, or other indication information) from the coding information of the LCU. The indication information indicates SLRs of all strings in the LCU.

Method VI: Decode the SLR of the current string from coding information of the CU to which the current string belongs. The coding information of the CU includes some related information for decoding the CU. For example, the coding information of the CU is a special reserved field that defines the bit length and is appended to the front of a corresponding data sequence of the CU in the bit stream. In this example, the coding information of the CU further includes the SLR. In some embodiments, the SLRs of strings included in the CU to which the current string belongs are the same, which are the SLRs all decoded from the coding information of the CU. In an example, the decoder end decodes one piece of indication information (such as an index, a syntax element, or other indication information) from the coding information of the CU. The indication information indicates SLRs of all strings in the CU.

Method VII: Decode the SLR of the current string from coding information of the current string. The coding information of the current string includes some related information for decoding the current string. For example, the coding information of the current string is a special reserved field that defines the bit length and is appended to the front of a corresponding data sequence of the current string in the bit stream. In this example, the coding information of the current string further includes the SLR of the current string. In an example, the decoder end decodes one piece of indication information (such as an index, a syntax element, or other indication information) from the coding information of the current string. The indication information indicates the SLR of the current string. Accordingly, the SLRs of different strings may be indicated in respective coding information, which is flexible.

Method VIII: Determine the SLR of the current string according to a size of a decoding block to which the current string belongs. In some standards, the foregoing decoding block is an M*N (M columns and N rows) sample matrix or a transform coefficient matrix. In some embodiments, the decoding block to which the current string belongs may be the CU to which the current string belongs. In some embodiments, the size of the decoding block to which the current string belongs is acquired. The size of the decoding block to which the current string belongs includes a height or a width of the decoding block to which the current string belongs. In one example, for a block having a size of 4×4, the SLR N is equal to 1, for a block having a size of 16×16, the SLR N is equal to 2, and for a block having an area (width×height) greater than 128, the SLR N is equal to 2.

Method IX: Determine the SLR of the current string according to a color component and a chroma format corresponding to the current string. The chroma format is a color coding format used by the pixel. In some standards, the chroma format (chroma_format) is a 2-digit unsigned integer, which specifies a format of a chroma component. The color component is a chroma component of the pixel in the chroma format. In some embodiments, the pixel in a current video is in RGB format or YUV format. In one example, in a video in YUV 4:2:0 format, when the SLR N of a determined luminance component is equal to 4, the SLR N of the chroma component is equal to 2.

Method X: Determine a second preset value as the SLR of the current string when a number of decoded strings in the CU to which the current string belongs is greater than or equal to a first threshold. The first threshold is the preset value, which is a basis for determining the SLR of the current string in this method. In some embodiments, the first threshold may be determined according to a specification of the CU, and the first thresholds corresponding to the CUs of different specifications may be the same or different. The second preset value is a preset value of the SLR, which is applicable to a case that the number of decoded strings in the CU to which the current string belongs is greater than or equal to the first threshold. The second preset value may be predetermined in a protocol. In an example, assuming that the number of decoded strings in the current CU is N1, when N1 is greater than or equal to the first threshold, the SLR of the current string may be determined as the second preset value that is 4. In addition, when the number of decoded strings in the CU to which the current string belongs is less than the first threshold, the SLR of the current string determined by using other methods described in the embodiments of this application, or another preset value different from the second preset value may be determined as the SLR of the current string, which is not limited in the embodiment of this application.

Method XI: Determine a third preset value as the SLR of the current string when a number of decoded and unmatched pixels in the CU to which the current string belongs is greater than or equal to a second threshold. The unmatched pixel is a pixel that is not successfully matched, that is, a pixel that does not match a pixel at a corresponding location in a reference string of the current string. The second threshold is the preset value, which is a basis for determining the SLR of the current string in this method. In some embodiments, the second threshold may be determined according to the number of decoded and unmatched pixels in the CU to which the current string belongs, and the second threshold corresponding to the number of CUs in different CUs may be the same or different. The third preset value is a preset value of the SLR, which is applicable to a case that the number of decoded and unmatched pixels in the CU to which the current string belongs is greater than or equal to the second threshold. The third preset value may be predetermined in a protocol. In an example, assuming that the number of decoded and unmatched pixels in the current CU is N2, when N2 is greater than or equal to the second threshold, it may be determined that the SLR of the current string is the third preset value. In addition, when the number of decoded and unmatched pixels in the CU to which the current string belongs is less than the second threshold, the SLR of the current string determined by using other methods described in the embodiments of this application, or another preset value different from the third preset value may be determined as the SLR of the current string, which is not limited in the embodiment of this application.

Method XII: Determine a fourth preset value as the SLR of the current string when a number of undecoded pixels in the CU to which the current string belongs is less than or equal to a third threshold. The third threshold is the preset value, which is a basis for determining the SLR of the current string in this method. In some embodiments, the third threshold may be determined according to the number of decoded and unmatched pixels in the CU to which the current string belongs, and the third threshold corresponding to the number of CUs in different CUs may be the same or different. The fourth preset value is a preset value of the SLR, which is applicable to a case that the number of undecoded pixels in the CU to which the current string belongs is less than or equal to the third threshold. The fourth preset value may be predetermined in a protocol. In addition, when the number of undecoded pixels in the CU to which the current string belongs is greater than the third threshold, the SLR of the current string determined by using other methods described in the embodiments of this application, or another preset value different from the fourth preset value may be determined as the SLR of the current string, which is not limited in the embodiment of this application.

Methods of inversely binarizing the binary symbol string for the string length information of the current string to obtain string length information compressed based on the SLR are described below. In the embodiments of this application, the following several inverse binarization methods are exemplarily provided.

Method I: The compressed string length information includes three parts, and a value of the compressed string length information is determined based on values of the three parts. The maximum value of the compressed string length information is allowed to be max_val, which may include the following steps.

1. Determine the maximum value of the compressed string length information, and determine a plurality of value range according to the maximum value.

The plurality of value ranges are a series of ranges in which values are integers. In some embodiments, the plurality of value ranges may be denoted as R0, R1, R2, . . . , and Rn. An index of an $x^{th}$ value range Rx is x, the $x^{th}$ value range Rx is expressed as [Rx_start, Rx_end), and x is a positive integer. The value of the maximum value max_val satisfies Rn_start≤max_val<Rn_end.

2. Decode the index x of the compressed string length information from the bit stream.

In the embodiment of this application, assuming that the index of the compressed string length information decoded from the bit stream is denoted as x, the index indicates the value range where a to-be-restored value val is located.

In some embodiments, the index of the compressed string length information is decoded from the bit stream by using a truncated unary code.

3. Determine, according to the value range Rx corresponding to the index x, that a value of a first part of the compressed string length information is Rx_start.

In the embodiment of this application, the first part of the string length information is denoted as val_part1.

In some embodiments, when there is only one integer value in the value range Rx, that is, a value of Rx_end-Rx_start is equal to 1, val=val_part1, and the inverse binarization ends.

In some embodiments, entropy decoding is performed on the index by CABAC, and each binary bit of the index has a corresponding context model.

In some embodiments, the context model of the index of the compressed string length information (that is, val) is determined according to the maximum value of the compressed string length information (that is, the value of max_val). The context model is configured to perform entropy decoding on the index by using the CABAC. For example, a set of context models are selected according to the value range in which max_val is located.

4. Calculate a maximum remainder and a number of digits of the maximum remainder according to the maximum value and the value of the first part.

The maximum remainder max_val_infix−max_val_Rx_start and the number of digits of the maximum remainder n=Ceil(Log(max_val_infix+1)). Ceil( ) represents rounding up, and Log( ) represents calculating the logarithm. The number of digits n of the maximum remainder is a number of digits required to code the maximum remainder in a method of a fixed-length code.

Then, a value of a second part of the compressed string length information is determined according to the number of digits of the maximum remainder. In some embodiments, the value of the second part is determined by using the following steps 5-7.

5. Determine a first bit length based on the number of digits of the maximum remainder.

The first bit length len=n−1.

6. Determine, when the first bit length is less than 1, that the value of the second part of the compressed string length information is 0.

In the embodiment of this application, the second part of the string length information is denoted as val_part2.

When the first bit length len<1, it is determined that val_part2=0.

7. When the first bit length is greater than or equal to 1, decode data of the first bit length from the bit stream, and inversely binarize the data of the first bit length in a method of a fixed-length code to obtain the value of the second part of the compressed string length information.

When the first bit length len is greater than or equal to 1, len bits are decoded from the bit stream, and the len bits are inversely binarized in a method of the fixed-length code, to obtain the value of val_part2.

Then, a value of a third part of the compressed string length information is determined according to the value of the second part and the maximum remainder. In some embodiments, the value of the third part is determined by using the following steps 8-10.

8. Set a target value to 0 when the value of the second part satisfies a first condition, or the maximum remainder is equal to 0, or otherwise set the target value to 1.

In some embodiments, when val_part2<$2^n$−max_val_infix−1 or max_val_infix=0, a value of a target value k is set to 0, or otherwise the value of k is set to 1.

9. Determine, when the target value k is equal to 0, that the value of the third part of the compressed string length information is 0.

In the embodiment of this application, the third part of the string length information is denoted as val_part3.

10. Determine that a second bit length is 1, decode data of the second bit length from the bit stream, and inversely binarize the data of the second bit length in a method of a fixed-length code to obtain the value of the third part of the compressed string length information, when the target value k is equal to 1.

The second bit length is set to len=1, the len bit is decoded from the bit stream, and the len bit is inversely binarized in a method of the fixed-length code, to obtain the value of val_part3.

11. Calculate, according to the value of the first part, the value of the second part, the value of the third part, the number of digits of the maximum remainder and the maximum remainder, a value of the compressed string length information.

In some embodiments, the value of the compressed string length information is calculated according to the value of the first part, the value of the second part, the value of the third part, the target value, the number of digits of the maximum remainder, and the maximum remainder.

That is, the value of the compressed string length information is calculated according to val_part1, val_part2, val_part3, k, n, and max_val_infix.

In some embodiments, the value of the compressed string length information val=val_part1+(val_part2<<k)+v−1_part3−($2^n$−max_val_infix−1)×k, << being a left shift symbol.

Method II: The compressed string length information includes two parts, and the value of the compressed string length information is determined based on values of the two parts. The maximum value of the compressed string length information is allowed to be max_val, which may include the following steps.

1. Determine the maximum value of the compressed string length information and a number of digits of the maximum value.

The maximum value of the compressed string length information is max_val, and the number of digits of the maximum value max_val is n=Ceil(Log(max_val+1)).

Then, the value of the first part of the compressed string length information is determined according to the number of digits of the maximum value. In some embodiments, the value of the first part is determined by using the following steps 2-4.

2. Determine a third bit length based on the number of digits of the maximum value.

The third bit length len=n−1.

3. Determine, when the third bit length is less than 1, that the value of the first part of the compressed string length information is 0.

In the embodiment of this application, the first part of the string length information is denoted as val_part1.

When len<1, it is determined that val_part1=0.

4. Decode data of the third bit length from the bit stream, and inversely binarize the data of the third bit length in a method of a fixed-length code to obtain the value of the first part of the compressed string length information, when the third bit length is greater than or equal to 1, and decode len bits from the bit stream, and inversely binarize the len bits in a method of the fixed-length code, to obtain the value of val_part1, when the len is greater than or equal to 1.

5. Calculate the maximum remainder according to the maximum value and the value of the first part.

The maximum remainder max_val_infix−max_val−val_part1.

Then the value of the second part of the compressed string length information is determined according to the value of the first part and the maximum remainder. In some embodiments, the value of the second part is determined by using the following steps 6-8.

6. Set a target value to 0 when the value of the first part satisfies a second condition or the maximum remainder is equal to 0, or otherwise set the target value to 1.

When val_part1<$2^n$−max_val_infix−1 or max_val_infix=0, a value of a target value k is set to 0, or otherwise the value of k is set to 1.

7. Determine, when the target value k is equal to 0, that the value of the second part of the compressed string length information is 0.

In the embodiment of this application, the second part of the string length information is denoted as val_part2.

When k=0, it is determined that val_part2=0.

8. Determine that a fourth bit length is 1, decode data of the fourth bit length from the bit stream, and inversely binarize the data of the fourth bit length in a method of a fixed-length code to obtain the value of the second part of the compressed string length information, when the target value k is equal to 1.

The fourth bit length is set to len=1, a len bit is decoded from the bit stream, and the len bit is inversely binarized in a method of the fixed-length code, to obtain the value of val_part2.

9. Calculate the value of the compressed string length information according to the value of the first part, the value of the second part, the number of digits of the maximum value, and the maximum value.

In some embodiments, the value of the compressed string length information is calculated according to the value of the first part, the value of the second part, the target value, the number of digits of the maximum value, and the maximum value.

That is, the value of the compressed string length information is calculated according to val_part1, val_part2, k, n, and max_val.

In some embodiments, the value of the compressed string length information val=(val_part1<<k)+v−1_part2−($2^n$−max_val−1)×k, << being a left shift symbol.

Method III: Inversely binarize the binary symbol string in a method of k-order exponential-Golomb code, to obtain the compressed string length information.

A main coding format of the k-order exponential-Golomb code is a structure of [prefix 0][1][bit information]. A length of 0s of the prefix (that is, a number of 0s in the prefix), a number of 1s, and the bit information are calculated. Accordingly, the entire coding is completed. The coding steps are as follows.

(1) Represent to-be-coded data in a binary form, remove k least significant bits, then add 1 to obtain a new value T1, check a number of bits included in T1, subtract 1 from the value, and obtain the number of prefixes 0.

(2) A value obtained after the k least significant bits removed in step (1) are added to T1 is temporarily referred to as T2.

(3) Add the prefix 0 before T2, so that the coding is completed.

In addition, the inverse binarization method through the k-order exponential-Golomb code is as follows.

When the k-order exponential-Golomb code is parsed, a first non-zero bit is first searched from a current location of the bit stream, a number of zero bits found is denoted as leadingZeroBits, and then CodeNum is calculated according to the leadingZeroBits. The process is described by pseudo-code as follows:

```
leadingZeroBits = −1;
for ( b = 0; ! b; leadingZeroBits++ )
b = read_bits(1)
CodeNum = 2^(leadingZeroBits + k) − 2^k + read_bits(leadingZeroBits + k)
```

Table 4 shows a structure of an exponential-Golomb code of order 0, 1, 2, and 3. A bit string of the exponential-Golomb code is partitioned into tw "parts" "pre"ix" an" "suffix". The prefix is formed by leadingZeroBits con'e'utive '0's'a'd one '1'. The suffix is formed by leadingZeroBits+k bits, that is, xi strings in the table, and the value 'f' xi i' '0' or '1'.

TABLE 4

Table of k-order exponential-Golomb codes

| Order | Codeword structure | CodeNum value range |
|---|---|---|
| k = 0 | 1 | 0 |
| | 0 1 $x_0$ | 1-2 |
| | 0 0 1 $x_1$ $x_0$ | 3-6 |
| | 0 0 0 1 $x_2$ $x_1$ $x_0$ | 7-14 |
| | ... | ... |
| k = 1 | 1 $x_0$ | 0-1 |
| | 0 1 $x_1$ $x_0$ | 2-5 |
| | 0 0 1 $x_2$ $x_1$ $x_0$ | 6-13 |
| | 0 0 0 1 $x_3$ $x_2$ $x_1$ $x_0$ | 14-29 |
| | ... | ... |
| k = 2 | 1 $x_1$ $x_0$ | 0-3 |
| | 0 1 $x_2$ $x_1$ $x_0$ | 4-11 |
| | 0 0 1 $x_3$ $x_2$ $x_1$ $x_0$ | 12-27 |
| | 0 0 0 1 $x_4$ $x_3$ $x_2$ $x_1$ $x_0$ | 28-59 |
| | ... | ... |
| k = 3 | 1 $x_2$ $x_1$ $x_0$ | 0-7 |
| | 0 1 $x_3$ $x_2$ $x_1$ $x_0$ | 8-23 |
| | 0 0 1 $x_4$ $x_3$ $x_2$ $x_1$ $x_0$ | 24-55 |
| | 0 0 0 1 $x_5$ $x_4$ $x_3$ $x_2$ $x_1$ $x_0$ | 56-119 |
| | ... | ... |

Method IV: Inversely binarize the binary symbol string according to a unary code or a truncated unary code, to obtain the compressed string length information.

A coding rule of the unary code is that for a to-be-code "ymbol "x">=0, the symbol is code " "ith x "1"s "1"s one "0". If the coder end binarizes the compressed string length information according to the unary code, after the value val of the compressed string length information is determined (val=synElVal), the foregoing Table 2 is queried to obtain the corresponding binary symbol string. Correspondingly, after the decoder end decodes the binary symbol string, the foregoing Table 2 is queried to restore the value val of the compressed string length information.

The truncated unary code is a variant of the unary code, and is used when the maximum value Max of a to-be-coded syntax element is known, and the maximum value Max herein is the maximum value max_val of the compressed string length information. Assuming that the to-be-coded symbol is x, if 0≤x≤Max, x is binarized by using the unary code. If x=Max, binary strings of the binarized x are all composed of 1 and have a length of Max. If the coder end binarizes the compressed string length information according to the truncated unary code, after the value val of the compressed string length information is determined (val=synElVal), the foregoing Table 1 is queried to obtain the corresponding binary symbol string. Correspondingly, after the decoder end decodes the binary symbol string, the foregoing Table 1 is queried to restore the value val of the compressed string length information.

Method V: Inversely binarize the binary symbol string in a method of an n-bit fixed-length code, to obtain the compressed string length information, n being a number of digits of a maximum value of the compressed string length information, and n being a positive integer. For example, n=Ceil (Log(max_val+1)), max_val representing the maximum value of the compressed string length information.

If the coder end binarizes the compressed string length information according to the n-bit fixed-length code, after the value val of the compressed string length information is determined (val=synElVal), the foregoing Table 3 is queried to obtain the corresponding binary symbol string. Correspondingly, after the decoder end decodes the binary symbol string, the foregoing Table 3 is queried to restore the value val of the compressed string length information. len is equal to n.

Method VI: Determine the value of the compressed string length information based on a plurality of parts, and let the value of the compressed string length information be val, val formed by n parts, that is, val=val_part_1+val_part_2+val_part_3+ . . . +val_part_n, and max_val_n=max_val−val_part_1+val_part_2+val_part_3+ . . . +val_part_n−1 being denoted, where max_val is the maximum value of val. The inverse binarization method may include the following several steps.

1. Determine the maximum value of the compressed string length information, and determine a plurality of value range according to the maximum value.

The plurality of value ranges are a series of ranges in which values are integers. In some embodiments, the plurality of value ranges may be denoted as R0, R1, R2, . . . , and Rn. An index of an $x^{th}$ value range Rx is x, the $x^{th}$ value range Rx is expressed as [Rx_start, Rx_end), and x is a positive integer. The value of max_val satisfies Rn_start≤max_val<Rn_end.

2. Decode the index x of the compressed string length information from the bit stream.

In the embodiment of this application, assuming that the index of the compressed string length information decoded from the bit stream is denoted as x, the index indicates the value range where a to-be-restored value val is located.

For example, the decoder end may decode the index of the compressed string length information from the bit stream according to any one of the inverse binarization methods in the foregoing methods I-V.

3. Determine, according to the value range Rx corresponding to the index x, that a value of a first part of the compressed string length information is Rx_start.

4: Successively determine values of remaining parts of the compressed string length information.

For example, the decoder end may determine the values of val_part_2, I_part_3, . . . , val_part_n according to any one of the foregoing inverse binarization methods in the foregoing methods I-V.

5. Determine the value of the compressed string length information according to the value of the first part and the values of the remaining parts.

The value of the compressed string length information is val=val_part_1+val_part_2+val_part_3+ . . . +val_part_n.

In one embodiment, the decoder end may select an appropriate method from the plurality of inverse binarization methods according to a specific application. The plurality of inverse binarization methods may include a plurality of methods described above.

For example, the decoder end selects, from the plurality of inverse binarization methods according to the SLR of the current string, a method of inversely binarizing the binary symbol string.

In another example, the decoder end selects, from the plurality of inverse binarization methods according to the maximum value of the string length information, a method of inversely binarizing the binary symbol string.

In another example, the decoder end selects, from the plurality of inverse binarization methods according to a quotient of a maximum value of the number of remaining pixels of the decoding block to which the current string belongs and the SLR of the current string, a method of inversely binarizing the binary symbol string.

In another example, the decoder end selects, from the plurality of inverse binarization methods according to a size of the decoding block to which the current string belongs, a method of inversely binarizing the binary symbol string.

The embodiments of this application provide a plurality of binarization/inverse binarization methods. Based on different to-be-binarized values, coding/decoding complexity of different methods and the length of the binary symbol string vary accordingly. Through the foregoing method, an appropriate binarization/inverse binarization method is selected directly or indirectly based on the SLR, and the binarization/inverse binarization method having optimal coding and decoding performance can be flexibly selected.

Several different methods for determining string length information and the methods for correspondingly determining the string length are described by using several examples.

In an example, the compressed string length information includes a string length code of the current string, which is denoted as $L_0$. Accordingly, the string length information includes the string length of the current string. The decoder end multiplies the string length code of the current string by the SLR to obtain the string length of the current string. In an example, the decoder end decodes, from the bit stream, the binary symbol string of the string length code $L_0$ of the current string, inversely binarizes the binary symbol string, restores the string length code $L_0$ of the current string, and then multiplies the string length code $L_0$ of the current string by the SLR N to obtain the string length L of the current string, that is, $L=L_0*N$. The string length code may also be referred to as a string length compressed by a resolution, that is, a quotient obtained by dividing a true value of the string length by the SLR N. During the coding, a number of characters required for the binarization representation of the string length code is less than a number of characters required for binarization representation of the true value of the string length. Accordingly, the complexity of coding and decoding can be reduced, and the performance of coding and decoding can be improved.

In this example, the compressed string length information includes the string length code $L_0$ of the current string. The decoder end may perform decoding to obtain a value (denoted as val) in the inverse binarization method described in the following embodiments, and the value of $L_0$ is equal to val.

In addition, in this example, the maximum value of the value val is allowed to be max_val, the number of remaining undecoded pixels in the decoding block to which the current string belongs is max_val_tmp, and the SLR of the current string is N, where max_val_tmp=NumTotalPixel−NumCodedPixel. NumTotalPixel represents a total number of pixels in the decoding block to which the current string belongs, and NumCodedPixel represents a number of decoded pixels in the decoding block to which the current string belongs. Since the current string may be (or may be not) the last string in a current decoding block, a value range of the string length L of the current string is [N, max_val_tmp]. After the string length L of the current string is compressed by the SLR N (that is, L/N), the value range [1, max_val_tmp/N] of the string length code $L_0$ of the current string is obtained. Therefore, if the compressed string length information includes the string length code $L_0$ of the current string, max_val is to be set to an integer value greater than or equal to max_val_tmp/N. In an example, max_val=max_val_tmp/N is allowed, which helps improve the coding and decoding efficiency.

In the embodiment of this application, the number of remaining undecoded pixels is compressed based on the SLR and binarized and coded into the bit stream. Compared with direct binarization and coding of a true value of the number of remaining undecoded pixels into the bit stream, the number of characters can be reduced, thereby reducing the complexity of coding and decoding, and improving the coding and decoding performance.

In another example, the compressed string length information includes the string length code of the current string minus 1, which is denoted as $L_0-1$. Accordingly, the string length information includes the string length of the current string. The decoder end adds 1 to the string length code of the current string minus 1 to obtain the string length code $L_0$ of the current string, and then multiplies the string length code $L_0$ of the current string by the SLR N to obtain the string length L of the current string, that is, $L=L_0*N$.

In this example, the compressed string length information includes the string length code of the current string minus 1 (that is, $L_0-1$). The decoder end may perform decoding to obtain a value (denoted as val) by using the inverse binarization method described in the following embodiments, and the value of $L_0$ is equal to val+1.

As described in the previous example, a minimum value of $L_0$ is 1, and therefore the compressed string length information may also include $L_0-1$. A value range of $L_0-1$ is [0, max_val_tmp/N−1]. Therefore, if the compressed string length information includes $L_0-1$, max_val is to be set to an integer value greater than or equal to max_val_tmp/N−1. In an example, max_val=max_val_tmp/N−1 is allowed, which helps improve the coding and decoding efficiency.

In another example, the compressed string length information includes a code of a number of remaining pixels in the decoding block to which the current string belongs after the current string is decoded. Accordingly, the string length information includes the number of remaining pixels in the decoding block to which the current string belongs after the current string is decoded. The number of remaining pixels in the decoding block to which the current string belongs after the current string is decoded is a number of remaining undecoded pixels in the decoding block to which the current string belongs after the current string is decoded. The code of the number of remaining pixels may also be referred to as the number of remaining pixels compressed by the resolution, that is, a quotient obtained by dividing the true value of the number of remaining pixels by the SLR N. The decoder end multiplies the code of the number of remaining pixels by the SLR to obtain the number of remaining pixels in the decoding block to which the current string belongs after the current string is decoded. During the coding, a number of characters required for binarization representation of the code of the number of remaining pixels is less than a number of characters required for binarization representation of the true value of the number of remaining pixels. Accordingly, the complexity of coding and decoding can be reduced, and the coding and decoding performance can be improved.

In some embodiments, the code of the number of remaining pixels is stored in a sequence header of a data sequence in the bit stream. The foregoing data sequence may be a data sequence corresponding to an image to which the current string belongs in the bit stream, or may be a data sequence corresponding to the current string in the bit stream, and may further be a data sequence corresponding to the CU to which the current string belongs in the bit stream, and the like, which is not limited in this application. In an example, the SLR of each string in the decoding block to which the current string belongs is 4. After the decoder end decodes the current string, assuming that the number of remaining undecoded pixels in the decoding block to which the current string belongs is 4, that is, a binary number of 100, the corresponding coding representation (that is, the code of the number of remaining pixels) is 1. In some embodiments, the foregoing number of remaining pixels is coded as $M_0$.

In some embodiments, step 803 may include the following several substeps (8031-8033).

Step 8031: Acquire a total number of pixels of a decoding block to which the current string belongs.

In some embodiments, the total number of pixels of the decoding block is obtained by multiplying a height by a width of the decoding block. In some embodiments, the total number of pixels of the decoding block to which the current string belongs is denoted as M.

Step 8032: Acquire a number of decoded pixels of the decoding block to which the current string belongs.

In some embodiments, the number of decoded pixels may be obtained by accumulating lengths of decoded pixel strings by the decoder end. In some embodiments, the number of decoded pixels of the decoding block to which the current string belongs is denoted as $M_2$.

Step 8033: Determine the string length of the current string based on the total number of pixels, the number of decoded pixels, and the number of remaining pixels after the current string is decoded.

In some embodiments, the decoder end multiplies the code $M_0$ of the number of remaining pixels by the SLR N to obtain the number $M_1$ of remaining pixels in the decoding block to which the current string belongs after the current string is decoded, that is, $M_1=M_0*N$.

In some embodiments, the number of decoded pixels and the number of remaining pixels are subtracted from the total number of pixels, to obtain the string length L of the current string, that is, $L=M-M_1-M_2$.

In this example, the compressed string length information includes the code $M_0$ of the number of remaining pixels in the decoding block to which the current string belongs after the current string is decoded. The decoder end may perform decoding to obtain a value (denoted as val) in the inverse binarization method described in the following embodiments, and the value of $M_0$ is equal to val.

In addition, in this example, the maximum value of the value val is allowed to be max_val, the number of remaining undecoded pixels in the decoding block to which the current string belongs is max_val_tmp, and the SLR of the current string is N, where max_val_tmp=NumTotalPixel—NumCodedPixel. NumTotalPixel represents the total number of pixels in the decoding block to which the current string belongs, and NumCodedPixel represents the number of decoded pixels in the decoding block to which the current string belongs. Since the current string may be (or may be not) the last string in the current decoding block, the value range of the string length L of the current string is [N, max_val_tmp]. Therefore, the value range of the number $M_1$ of remaining pixels after the current string is decoded is [0, max_val_tmp−N]. After the number $M_1$ of remaining pixels after the current string is decoded is compressed by the SLR N (that is $M_1/N$), the value range of the code $M_0$ of the number of remaining pixels after the current string is decoded is [0, max_val_tmp/N−1]. Therefore, if the compressed string length information includes the code $M_0$ of the number of remaining pixels after the current string is decoded, max_val is to be set to an integer value greater than or equal to max_val_tmp/N−1. In an example, max_val=max_val_tmp/N−1 is allowed, which helps improve the coding and decoding efficiency.

In the embodiment of this application, the number of remaining pixels after the current string is decoded is compressed based on the SLR and binarized and coded into the bit stream. Compared with direct binarization and coding of a true value of the number of remaining pixels into the bit stream, the number of characters can be reduced, thereby reducing the complexity of coding and decoding, and improving the coding and decoding performance.

In another example, the compressed string length information includes a first flag. The first flag is used for indicating whether the current string is the last string in the decoding block to which the current string belongs.

In some embodiments, the first flag is a binary variable, which is represented by a binary number. In some embodiments, when the first flag is 0, the current string is the last string in the decoding block to which the current string belongs. When the first flag is 1, the current string is not the last string in the decoding block to which the current string belongs.

In some embodiments, the code of the number of remaining pixels in the decoding block to which the current string belongs after the current string is decoded is acquired when it is determined according to the first flag that the current string is not the last string. The string length information further includes the code of the number of remaining pixels in the decoding block to which the current string belongs after the current string is decoded. Alternatively, the string length information further includes the code of the number of remaining pixels in the decoding block to which the current string belongs after the current string is decoded minus 1. Then the code of the number of remaining pixels is multiplied by the SLR to obtain the number of remaining pixels in the decoding block to which the current string belongs after the current string is decoded.

In some embodiments, step 803 may include the following several substeps (803*a*-803*d*).

Step 803*a*: Acquire the total number of pixels of the decoding block to which the current string belongs.

Step 803*b*: Acquire a number of decoded pixels of the decoding block to which the current string belongs.

Step 803*c*: Subtract the number of decoded pixels from the total number of pixels to obtain the string length of the current string when the current string is the last string.

In some embodiments, the number $M_2$ of decoded pixels is subtracted from the total number M of pixels to obtain the string length L of the current string, that is, $L=M-M_2$.

Step 803*d*: Determine the string length of the current string based on the total number of pixels, the number of decoded pixels, and the number of remaining pixels after the current string is decoded, when the current string is not the last string.

In some embodiments, the code obtained by subtracting 1 from the code of the number of remaining pixels is denoted as $M_0$. In some embodiments, the code $M_0$ of the code of the number of remaining pixels minus 1 to which 1 is added is multiplied by the SLR to obtain the number $M_1$ of remaining pixels in the decoding block to which the current string belongs after the current string is decoded, that is, $M_1=(M_0+1)*N$. In some embodiments, the number of decoded pixels and the number of remaining pixels are subtracted from the total number of pixels, to obtain the string length L of the current string, that is, $L=M-M_1-M_2$.

In this example, the compressed string length information includes the code $M_0-1$ of the number of remaining pixels in the decoding block to which the current string belongs after the current string is decoded, by way of example. The decoder end may perform decoding to obtain a value (denoted as val) in the inverse binarization method described in the following embodiments, and the value of $M_0$ is equal to val+1.

In addition, in this example, whether the current string is/is not the last string in the current decoding block is indicated by the first flag. If the current string is not the last string, the bit stream includes related information of the number of remaining pixels after the current string is decoded. Therefore, when the current string is not the last string, the value range of the string length L of the current string is [N, max_val_tmp-N], and the value range of the number $M_1$ of remaining pixels after the current string is decoded is [N, max_val_tmp-N]. After the number $M_1$ of remaining pixels after the current string is decoded is compressed by the SLR N (that is $M_1/N$), the value range of the code $M_0$ of the number of remaining pixels after the current string is decoded is [1, max_val_tmp/N-1]. A minimum value of $M_0$ is 1, and therefore the compressed string length information may also include $M_0-1$. A value range of $M_0-1$ is [0, max_val_tmp/N-2]. Therefore, if the compressed string length information includes $M_0-1$, max_val is to be set to an integer value greater than or equal to max_val_tmpN-2. In an example, max_val=max_val_tmp/N-2 is allowed, which helps improve the coding and decoding efficiency.

In the embodiment of this application, the number of remaining pixels after the current string is decoded is compressed based on the SLR and binarized and coded into the bit stream. Compared with direct binarization and coding of a true value of the number of remaining pixels into the bit stream, the number of characters can be reduced, thereby reducing the complexity of coding and decoding, and improving the coding and decoding performance.

Figure 9:
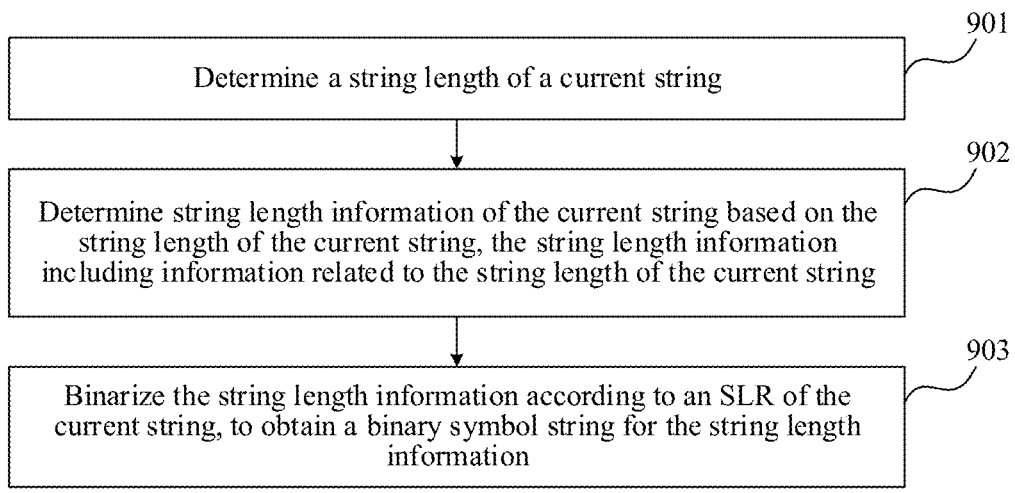
FIG. 9 is a flowchart of a video coding method according to an embodiment of this application.

FIG. 9 shows a flowchart of a video coding method according to an embodiment of this application. The method may be applicable to a coder-end device, that is, the method may be performed by the coder-end device. The method may include the following steps (901 to 903):

Step 901: Determine a string length of a current string.

For a coding process, the current string is a pixel string that is currently coded.

Step 902: Determine string length information of the current string based on the string length of the current string, the string length information including information related to the string length of the current string.

In one example, the string length information includes the string length of the current string.

In another example, the string length information includes a number of remaining pixels in a coding block to which the current string belongs after the current string is coded.

The coder end acquires a total number of pixels of the coding block to which the current string belongs, and acquires a number of coded pixels of the coding block to which the current string belongs. The number of remaining pixels in the coding block to which the current string belongs after the current string is coded is determined based on the total number of pixels, the number of coded pixels, and the string length of the current string.

Step 903: Binarize the string length information according to a string length resolution (SLR) of the current string, to obtain a binary symbol string for the string length information.

In some embodiments, compressed string length information is determined according to the string length information and the SLR. The compressed string length information is binarized to obtain the binary symbol string for the string length information.

The binarization may adopt a method corresponding to the inverse binarization described above, and details are not described again in this embodiment.

In some embodiments, if the string length information includes the string length of the current string, the coder end may divide the string length of the current string by the SLR to obtain a string length code of the current string. Accordingly, the compressed string length information may include the string length code of the current string, or may include the string length code of the current string minus 1.

In some embodiments, if the string length information includes the number of remaining pixels in the coding block to which the current string belongs after the current string is coded, the coder end may divide the number of remaining pixels by the SLR to obtain the code of the number of remaining pixels. Accordingly, the compressed string length information may include the code of the number of remaining pixels in the coding block to which the current string belongs after the current string is coded, or may include the code of the number of remaining pixels in the coding block to which the current string belongs after the current string is coded minus 1.

In one embodiment, the coder end may select an appropriate binarization method.

For example, the coder end selects, from the plurality of binarization methods according to the SLR of the current string, a method of binarizing the string length information.

In another example, the coder end selects, from the plurality of binarization methods according to the maximum value of the string length information, a method of binarizing the string length information.

In another example, the coder end selects, from the plurality of binarization methods according to a quotient of a maximum value of the number of remaining pixels of the coding block to which the current string belongs and the SLR of the current string, a method of binarizing the string length information.

In another example, the coder end selects, from the plurality of binarization methods according to a size of the coding block to which the current string belongs, a method of binarizing the string length information.

In one embodiment, the following several methods of determining the SLR of the current string are provided.

Method I: The SLR of the current string is a first preset value.

Method II: SLRs of strings included in an image sequence to which the current string belongs are the same, and the SLR of the current string is coded and then added to a sequence header of the image sequence to which the current string belongs.

Method III: SLRs of strings included in an image to which the current string belongs are the same, and the SLR of the current string is coded and then added to an image header of the image to which the current string belongs.

Method IV: SLRs of strings included in a patch to which the current string belongs are the same, and the SLR of the current string is coded and then added to a patch header of the patch to which the current string belongs.

Method V: SLRs of strings included in an LCU to which the current string belongs are the same, and the SLR of the current string is coded and then added to coding information of the LCU to which the current string belongs.

Method VI: SLRs of strings included in a CU to which the current string belongs are the same, and the SLR of the current string is coded and then added to coding information of the CU to which the current string belongs.

Method VII: The SLR of the current string is coded and then added to coding information of the current string.

Method VIII: The SLR of the current string is determined according to a size of a decoding block to which the current string belongs.

Method IX: The SLR of the current string is determined according to a color component and a chroma format corresponding to the current string.

Method X: The SLR of the current string is a second preset value when a number of decoded strings in the CU to which the current string belongs is greater than or equal to a first threshold.

Method XI: The SLR of the current string is a third preset value when a number of decoded and unmatched pixels in the CU to which the current string belongs is greater than or equal to a second threshold.

Method XII: The SLR of the current string is a fourth preset value when a number of decoded pixels in the CU to which the current string belongs is less than or equal to the third threshold.

Based on the above, in the technical solution provided in the embodiments of this application, by using the SLR as a basis for partitioning and coding and decoding of the pixel strings, a length of the pixel string in a coding/decoding block may be limited to a multiple of the SLR, which improves uniformity of the pixel strings, so that a codec end can perform coding and decoding under a condition of memory alignment, thereby improving coding and decoding efficiency of the pixel string.

In addition, in view of impact of the SLR on coding and decoding of the string length information, this application provides methods for binarizing and inversely binarizing the string length information. The methods improve coding and decoding methods of the string length information under different SLRs, which helps improve coding and decoding performance.

The following is an apparatus embodiment of this application, which can be used to perform the method embodiments of this application. For details not disclosed in the apparatus embodiments of this application, refer to the method embodiments of this application.

Figure 10:
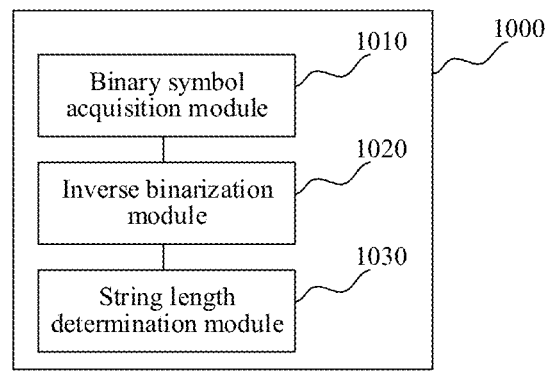
FIG. 10 is a block diagram of a video decoding apparatus according to an embodiment of this application.

FIG. 10 shows a block diagram of a video decoding apparatus according to an embodiment of this application. The apparatus has a function of realizing the example of the foregoing video decoding method, and the function may be realized by hardware or by hardware executing corresponding software. The apparatus may be the computer device described above, or may be disposed in the computer device. The apparatus 1000 may include a binary symbol acquisition module 1010, an inverse binarization module 1020, and a string length determination module 1030.

The binary symbol acquisition module 1010 is configured to decode, from a bit stream, a binary symbol string for string length information of a current string. The string length information includes information related to a string length of the current string.

The inverse binarization module 1020 is configured to inversely binarize the binary symbol string according to a string length resolution (SLR) of the current string, to obtain the string length information.

The string length determination module 1030 is configured to determine the string length of the current string according to the string length information.

In one embodiment, the inverse binarization module 1020 includes:

an inverse binarization unit, configured to inversely binarize the binary symbol string, to obtain string length information compressed based on the SLR; and a length information determination unit, configured to determine the string length information according to the compressed string length information and the SLR.

In one embodiment, the inverse binarization unit is specifically configured to:
  determine a maximum value of the compressed string length information, and determine a plurality of value ranges according to the maximum value, an index of an $x^{th}$ value range Rx being x, the $x^{th}$ value range Rx being expressed as [Rx_start, Rx_end), and x being a positive integer;
  decode the index x of the compressed string length information from the bit stream;
  determine, according to the value range Rx corresponding to the index x, that a value of a first part of the compressed string length information is Rx_start;
  calculate a maximum remainder and a number of digits of the maximum remainder according to the maximum value and the value of the first part;
  determine a value of a second part of the compressed string length information according to the number of digits of the maximum remainder;
  determine a value of a third part of the compressed string length information according to the value of the second part and the maximum remainder; and
  calculate a value of the compressed string length information according to the value of the first part, the value of the second part, the value of the third part, the number of digits of the maximum remainder, and the maximum remainder.

In some embodiments, the inverse binarization unit is specifically configured to:
  determine a first bit length based on the number of digits of the maximum remainder;
  determine that the value of the second part is 0 when the first bit length is less than 1; and
  decode data of the first bit length from the bit stream, and inversely binarize the data of the first bit length in a method of a fixed-length code to obtain the value of the second part, when the first bit length is greater than or equal to 1.

In some embodiments, the inverse binarization unit is specifically configured to:
  set a target value to 0 when the value of the second part satisfies a first condition or the maximum remainder is equal to 0, or otherwise set the target value to 1;
  determine that the value of the third part is 0 when the target value is equal to 0; and
  determine that a second bit length is 1, decode data of the second bit length from the bit stream, and inversely binarize the data of the second bit length using a fixed-length code to obtain the value of the third part, when the target value is equal to 1.

In one embodiment, the inverse binarization unit is further configured to determine a context model of an index of the compressed string length information according to the maximum value of the compressed string length information. The context model is configured to perform entropy decoding on the index by content adaptive binary arithmetic coding (CABAC).

In one embodiment, the inverse binarization unit is specifically configured to:
  determine a maximum value of the compressed string length information and a number of digits of the maximum value;
  determine a value of a first part of the compressed string length information according to the number of digits of the maximum value;
  calculate the maximum remainder according to the maximum value and the value of the first part;
  determine a value of a second part of the compressed string length information according to the value of the first part and the maximum remainder; and
  calculate a value of the compressed string length information according to the value of the first part, the value of the second part, the number of digits of the maximum value, and the maximum value.

In some embodiments, the inverse binarization unit is specifically configured to:
  determine a third bit length based on the number of digits of the maximum value;
  determine that the value of the first part is 0 when the third bit length is less than 1; and
  decode data of the third bit length from the bit stream, and inversely binarize the data of the third bit length using a fixed-length code to obtain the value of the first part, when the third bit length is greater than or equal to 1.

In some embodiments, the inverse binarization unit is specifically configured to:
  set a target value to 0 when the value of the first part satisfies a second condition, or the maximum remainder is equal to 0, or otherwise set the target value to 1;
  determine that the value of the second part is 0 when the target value is equal to 0; and
  determine that a fourth bit length is 1, decode data of the fourth bit length from the bit stream, and inversely binarize the data of the fourth bit length using a fixed-length code, to obtain the value of the second part, when the target value is equal to 1.

In one embodiment, the inverse binarization unit is specifically configured to inversely binarize the binary symbol string using a k-order exponential-Golomb code, to obtain the compressed string length information.

In one embodiment, the inverse binarization unit is specifically configured to inversely binarize the binary symbol string by using a unary code or a truncated unary code, to obtain the compressed string length information.

In one embodiment, the inverse binarization unit is specifically configured to inversely binarize the binary symbol string using an n-bit fixed-length code, to obtain the compressed string length information. n is a number of digits of a maximum value of the compressed string length information, and n is a positive integer.

In one embodiment, a value of the compressed string length information is determined based on a plurality of parts. The inverse binarization unit is specifically configured to:
  determine a maximum value of the compressed string length information, and determine a plurality of value ranges according to the maximum value, an index of an $x^{th}$ value range Rx being x, the $x^{th}$ value range Rx being expressed as [Rx_start, Rx_end), and x being a positive integer;
  decode the index x of the compressed string length information from the bit stream;
  determine, according to the value range Rx corresponding to the index x, that a value of a first part of the compressed string length information is Rx_start;
  successively determine values of remaining parts of the compressed string length information; and determine the value of the compressed string length information according to the value of the first part and the values of the remaining parts.

In one embodiment, the compressed string length information includes a string length code of the current string.

The length information determination unit is specifically configured to multiply the string length code of the current string by the SLR to obtain the string length of the current string.

In one embodiment, the compressed string length information includes the string length code of the current string minus 1.

The length information determination unit is specifically configured to: add 1 to the string length code of the current string minus 1, to obtain the string length code of the current string; and multiply the string length code of the current string by the SLR to obtain the string length of the current string.

In one embodiment, the compressed string length information includes a code of a number of remaining pixels in a decoding block to which the current string belongs after the current string is decoded.

The length information determination unit is configured to multiply the code of the number of remaining pixels by the SLR to obtain a number of remaining pixels in the decoding block to which the current string belongs after the current string is decoded.

Accordingly, the string length determination module 1030 is configured to: acquire a total number of pixels of the decoding block to which the current string belongs; acquire a number of decoded pixels of the decoding block to which the current string belongs; and determine the string length of the current string based on the total number of pixels, the number of decoded pixels, and the number of remaining pixels after the current string is decoded.

In one embodiment, the compressed string length information includes a first flag. The first flag is used for indicating whether the current string is the last string in the decoding block to which the current string belongs.

The length information determination unit is configured to: acquire the code of the number of remaining pixels in the decoding block to which the current string belongs after the current string is decoded, when it is determined according to the first flag that the current string is not the last string; the string length information further including the code of the number of remaining pixels in the decoding block to which the current string belongs after the current string is decoded; or the string length information further including the code of the number of remaining pixels in the decoding block to which the current string belongs after the current string is decoded minus 1; and multiply the code of the number of remaining pixels by the SLR to obtain the number of remaining pixels in the decoding block to which the current string belongs after the current string is decoded.

Accordingly, the string length determination module 1030 is configured to: acquire a total number of pixels of the decoding block to which the current string belongs; acquire a number of decoded pixels of the decoding block to which the current string belongs; subtract the number of decoded pixels from the total number of pixels to obtain the string length of the current string, when the current string is the last string; and determine the string length of the current string based on the total number of pixels, the number of decoded pixels, and the number of remaining pixels after the current string is decoded, when the current string is not the last string.

In one embodiment, the apparatus 1000 further includes a resolution determination module, configured to:
determine a first preset value as the SLR of the current string; or
decode the SLR of the current string from a sequence header of an image sequence to which the current string belongs, strings included in the image sequence to which the current string belongs having a same SLR; or
decode the SLR of the current string from an image header of an image to which the current string belongs, strings included in the image to which the current string belongs having a same SLR; or
decode the SLR of the current string from a patch header of a patch to which the current string belongs, strings included in the patch to which the current string belongs having a same SLR; or
decode the SLR of the current string from coding information of a largest coding unit (LCU) to which the current string belongs, strings included in the LCU to which the current string belongs having a same SLR; or
decode the SLR of the current string from coding information of a coding unit (CU) to which the current string belongs, strings included in the CU to which the current string belongs having a same SLR; or
decode the SLR of the current string from the coding information of the current string.

In one embodiment, the apparatus 1000 further includes a method selection module, configured to:
select, from a plurality of inverse binarization methods according to the SLR of the current string, a method of inversely binarizing the binary symbol string; or
select, from a plurality of inverse binarization methods according to a maximum value of the string length information, a method of inversely binarizing the binary symbol string; or
select, from a plurality of inverse binarization methods according to a quotient of a maximum value of the number of remaining pixels of the decoding block to which the current string belongs and the SLR of the current string, a method of inversely binarizing the binary symbol string; or
select, from a plurality of inverse binarization methods according to a size of the decoding block to which the current string belongs, a method of inversely binarizing the binary symbol string.

Figure 11:
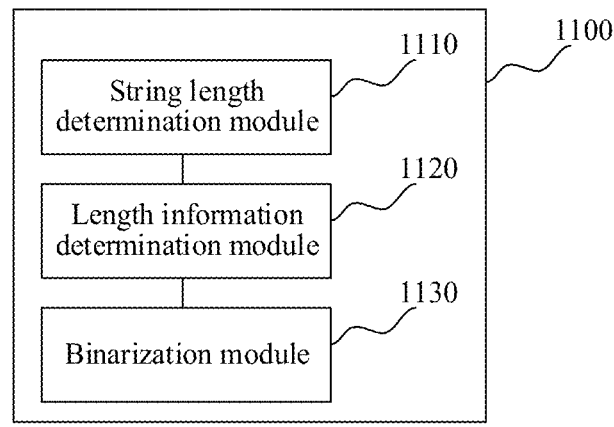
FIG. 11 is a block diagram of a video coding apparatus according to an embodiment of this application.

FIG. 11 shows a block diagram of a video coding apparatus according to an embodiment of this application. The apparatus has a function of realizing the example of the foregoing video encoding method, and the function may be realized by hardware or by hardware executing corresponding software. The apparatus may be the computer device described above, or may be disposed in the computer device. The apparatus 1100 may include a string length determination module 1110, a length information determination module 1120, and a binarization module 1130.

The string length determination module 1110 is configured to determine a string length of a current string.

The length information determination module 1120 is configured to determine string length information of the current string based on the string length of the current string, the string length information including information related to the string length of the current string.

The binarization module 1130 is configured to binarize the string length information according to a string length resolution (SLR) of the current string, to obtain a binary symbol string for the string length information.

In one embodiment, the binarization module 1130 includes:
- a length information determination unit, configured to determine compressed string length information according to the string length information and the SLR; and
- a binarization unit, configured to binarize the compressed string length information to obtain the binary symbol string for the string length information.

In some embodiments, the binarization may adopt a method corresponding to the inverse binarization described above, and details are not described again in this embodiment.

In some embodiments, if the string length information includes the string length of the current string, the length information determination unit may be configured to divide the string length of the current string by the SLR to obtain a string length code of the current string. Accordingly, the compressed string length information may include the string length code of the current string, or may include the string length code of the current string minus 1.

In some embodiments, if the string length information includes a number of remaining pixels in the coding block to which the current string belongs after the current string is coded, the length information determination unit may be configured to divide the number of remaining pixels by the SLR to obtain a code of a number of remaining pixels. Accordingly, the compressed string length information may include the code of the number of remaining pixels in the coding block to which the current string belongs after the current string is coded, or may include the code of the number of remaining pixels in the coding block to which the current string belongs after the current string is coded minus 1.

In one embodiment, the SLR of the current string is determined in any one of the following methods.

Method I: The SLR of the current string is a first preset value.

Method II: SLRs of strings included in an image sequence to which the current string belongs are the same, and the SLR of the current string is coded and then added to a sequence header of the image sequence to which the current string belongs.

Method III: SLRs of strings included in an image to which the current string belongs are the same, and the SLR of the current string is coded and then added to an image header of the image to which the current string belongs.

Method IV: SLRs of strings included in a patch to which the current string belongs are the same, and the SLR of the current string is coded and then added to a patch header of the patch to which the current string belongs.

Method V: SLRs of strings included in an LCU to which the current string belongs are the same, and the SLR of the current string is coded and then added to coding information of the LCU to which the current string belongs.

Method VI: SLRs of strings included in a CU to which the current string belongs are the same, and the SLR of the current string is coded and then added to coding information of the CU to which the current string belongs.

Method VII: The SLR of the current string is coded and then added to coding information of the current string.

Method VIII: The SLR of the current string is determined according to a size of a decoding block to which the current string belongs.

Method IX: The SLR of the current string is determined according to a color component and a chroma format corresponding to the current string.

Method X: The SLR of the current string is a second preset value when a number of decoded strings in the CU to which the current string belongs is greater than or equal to a first threshold.

Method XI: The SLR of the current string is a third preset value when a number of decoded and unmatched pixels in the CU to which the current string belongs is greater than or equal to a second threshold.

Method XII: The SLR of the current string is a fourth preset value when a number of decoded pixels in the CU to which the current string belongs is less than or equal to the third threshold.

In an exemplary embodiment, the apparatus 1100 further includes a method selection module, configured to:
- select, from the plurality of binarization methods according to the SLR of the current string, a method of binarizing the string length information; or
- select, from the plurality of binarization methods according to a maximum value of the string length information, a method of binarizing the string length information;
- select, from the plurality of binarization methods according to a quotient of a maximum value of the number of remaining pixels of the coding block to which the current string belongs and the SLR of the current string, a method of binarizing the string length information; or
- select, from the plurality of binarization methods according to a size of the coding block to which the current string belongs, a method of binarizing the string length information.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 12:
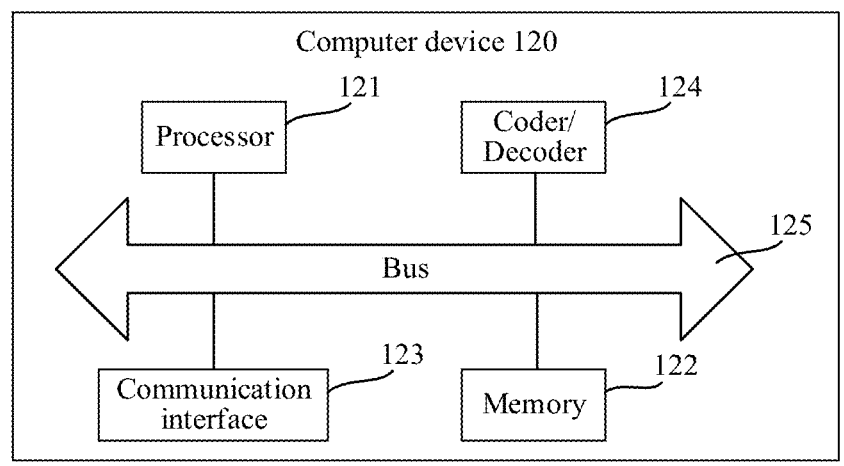
FIG. 12 is a structural block diagram of a computer device according to an embodiment of this application.

FIG. 12 shows a structural block diagram of a computer device according to an embodiment of this application. The computer device may be the encoder side device described above, or may be the decoder side device described above. The computer device 120 may include a processor 121, a memory 122, a communication interface 123, an encoder/decoder 124, and a bus 125.

The processor 121 includes one or more processing cores. The processor 121 runs a software program and a module to execute various functional applications and perform information processing.

The memory 122 may be configured to store a computer program, and the processor 121 is configured to execute the computer program, so as to implement the foregoing video decoding method or implement the foregoing video coding method.

The communication interface 123 may be configured to communicate with other devices, for example, receiving/transmitting audio and video data.

The encoder/decoder 124 may be configured to implement encoding and decoding functions, for example, encoding and decoding audio and video data.

The memory 122 is connected to the processor 121 through the bus 125.

In addition, the memory 122 may be implemented by any type of volatile or non-volatile storage device or a combination thereof. The volatile or non-volatile storage device includes, but not limited to a magnetic disk, an optical disc, an electrically erasable programmable read-only memory (EEPROM), an erasable programmable read-only memory (EPROM), a static random access memory (SRAM), a read only memory (ROM), a magnetic memory, a flash memory, or a programmable read-only memory (PROM).

A person skilled in the art may understand that the structure shown in FIG. 12 does not constitute any limitation on the computer device 120, and the computer device may include more components or fewer components than those shown in the figure, or some components may be combined, or a different component deployment may be used.

In one embodiment, a computer-readable storage medium is further provided, storing at least one instruction, at least one program, a code set, or an instruction set, the at least one instruction, the at least one program, the code set, or the instruction set, when executed by a processor, implementing the foregoing video decoding method.

In one embodiment, a computer-readable storage medium is further provided, storing at least one instruction, at least one program, a code set, or an instruction set, the at least one instruction, the at least one program, the code set, or the instruction set being loaded and executed by a processor to implement the foregoing video coding method.

In one embodiment, a computer program product or a computer program is further provided. The computer program product or the computer program includes computer instructions, and the computer instructions are stored in a computer-readable storage medium. The processor of the computer device reads the computer instruction from the computer-readable storage medium. The processor executes the computer instruction, causing the computer device to perform the above video decoding method.

In one embodiment, a computer program product or a computer program is further provided. The computer program product or the computer program includes computer instructions, and the computer instructions are stored in a computer-readable storage medium. The processor of the computer device reads the computer instruction from the computer-readable storage medium. The processor executes the computer instruction, causing the computer device to perform the above video coding method.

It is to be u "derstood tha" "plurality of" mentioned in the specification mean "two o" more. "And/or" describes an association relationship for associated objects and represents that three relationships may exist. For example, A and/or B may represent the following three cases: only A exists, both A and B exist, and only B exists. "T"e character "/" generall "i"dicates an "or" relationship between the associated objects.

The foregoing descriptions are merely examples of the embodiments of this application, but are not intended to limit this application. Any modification, equivalent replacement, or improvement made without departing from the spirit and principle of this application shall fall within the protection scope of this application.

What claimed is:

1. A video decoding method, performed by a computing device, comprising:
   decoding, from a bit stream, a binary symbol string with string length information of a current string and a string length resolution (SLR) of the current string, the string length information comprising information related to a string length of the current string, wherein the SLR is a minimum string length by which a CU is partitioned into pixel strings;
   inversely binarizing the binary symbol string according to the SLR of the current string, to obtain the string length information; and
   determining the string length of the current string according to the string length information,
   wherein a length of a pixel string of the current string is a multiple of the SLR and is aligned with a number of pixels that a memory of the computing device is configured to simultaneously process in parallel; and
   decoding the SLR of the current string comprises one of:
      decoding the SLR of the current string from an image header of an image to which the current string belongs, strings comprised in the image to which the current string belongs having a same SLR;
      decoding the SLR of the current string from a patch header of a patch to which the current string belongs, strings comprised in the patch to which the current string belongs having a same SLR;
      decoding the SLR of the current string from coding information of a largest coding unit (LCU) to which the current string belongs, strings comprised in the LCU to which the current string belongs having a same SLR; and
      decoding the SLR of the current string from coding information of a coding unit (CU) to which the current string belongs, strings comprised in the CU to which the current string belongs having a same SLR.

2. The method according to claim 1, wherein the inversely binarizing the binary symbol string according to an SLR of the current string, to obtain the string length information comprises:
   inversely binarizing the binary symbol string, to obtain string length information compressed based on the SLR; and
   determining the string length information according to the compressed string length information and the SLR.

3. The method according to claim 2, wherein the inversely binarizing the binary symbol string, to obtain string length information compressed based on the SLR comprises:
   determining a maximum value of the compressed string length information, and determining a plurality of value ranges according to the maximum value, an index of an $x^{th}$ value range Rx being x, the $x^{th}$ value range Rx being expressed as [Rx_start, Rx_end), and x being a positive integer;
   decoding the index x of the compressed string length information from the bit stream;
   determining, according to the value range Rx corresponding to the index x, that a value of a first part of the compressed string length information is Rx_start;
   calculating a maximum remainder and a number of digits of the maximum remainder according to the maximum value and the value of the first part;
   determining a value of a second part of the compressed string length information according to the number of digits of the maximum remainder;
   determining a value of a third part of the compressed string length information according to the value of the second part and the maximum remainder; and
   calculating a value of the compressed string length information according to the value of the first part, the value of the second part, the value of the third part, the number of digits of the maximum remainder, and the maximum remainder.

4. The method according to claim 3, wherein the determining a value of a second part of the compressed string length information according to the number of digits of the maximum remainder comprises:
determining a first bit length based on the number of digits of the maximum remainder;
determining that the value of the second part is 0 when the first bit length is less than 1; and
decoding data of the first bit length from the bit stream, and inversely binarizing the data of the first bit length using a fixed-length code to obtain the value of the second part, when the first bit length is greater than or equal to 1.

5. The method according to claim 3, wherein the determining a value of a third part of the compressed string length information according to the value of the second part and the maximum remainder comprises:
setting a target value to 0 when the value of the second part satisfies a first condition, or the maximum remainder is equal to 0, or otherwise setting the target value to 1;
determining that the value of the third part is 0 when the target value is equal to 0; and
determining that a second bit length is 1, decoding data of the second bit length from the bit stream, and inversely binarizing the data of the second bit length using a fixed-length code method to obtain the value of the third part, when the target value is equal to 1.

6. The method according to claim 3, further comprising:
determining a context model of an index of the compressed string length information according to the maximum value of the compressed string length information, the context model being configured to perform entropy decoding on the index by content adaptive binary arithmetic coding (CABAC).

7. The method according to claim 2, wherein the inversely binarizing the binary symbol string, to obtain string length information compressed based on the SLR comprises:
determining a maximum value of the compressed string length information and a number of digits of the maximum value;
determining a value of a first part of the compressed string length information according to the number of digits of the maximum value;
calculating a maximum remainder according to the maximum value and the value of the first part;
determining a value of a second part of the compressed string length information according to the value of the first part and the maximum remainder; and
calculating a value of the compressed string length information according to the value of the first part, the value of the second part, the number of digits of the maximum value, and the maximum value.

8. The method according to claim 7, wherein the determining a value of a first part of the compressed string length information according to the number of digits of the maximum value comprises:
determining a third bit length based on the number of digits of the maximum value;
determining that the value of the first part is 0 when the third bit length is less than 1; and
decoding data of the third bit length from the bit stream, and inversely binarizing the data of the third bit length using a fixed-length code to obtain the value of the first part, when the third bit length is greater than or equal to 1.

9. The method according to claim 7, wherein the determining a value of a second part of the compressed string length information according to the value of the first part and the maximum remainder comprises:
setting a target value to 0 when the value of the first part satisfies a second condition, or the maximum remainder is equal to 0, or otherwise setting the target value to 1;
determining that the value of the second part is 0 when the target value is equal to 0; and
determining that a fourth bit length is 1, decoding data of the fourth bit length from the bit stream, and inversely binarizing the data of the fourth bit length using a fixed-length code to obtain the value of the second part, when the target value is equal to 1.

10. The method according to claim 2, wherein the inversely binarizing the binary symbol string, to obtain string length information compressed based on the SLR comprises:
inversely binarizing the binary symbol string in a method of a k-order exponential-Golomb code, to obtain the compressed string length information.

11. The method according to claim 2, wherein the inversely binarizing the binary symbol string, to obtain string length information compressed based on the SLR comprises:
inversely binarizing the binary symbol string by using a unary code or a truncated unary code, to obtain the compressed string length information.

12. The method according to claim 2, wherein the inversely binarizing the binary symbol string, to obtain string length information compressed based on the SLR comprises:
inversely binarizing the binary symbol string using an n-bit fixed-length code, to obtain the compressed string length information,
n being a number of digits of a maximum value of the compressed string length information, and n being a positive integer.

13. The method according to claim 2, wherein a value of the compressed string length information is determined based on a plurality of parts; and
the inversely binarizing the binary symbol string, to obtain string length information compressed based on the SLR comprises:
determining a maximum value of the compressed string length information, and determining a plurality of value ranges according to the maximum value, an index of an $x^{th}$ value range Rx being x, the $x^{th}$ value range Rx being expressed as [Rx_start, Rx_end), and x being a positive integer;
decoding the index x of the compressed string length information from the bit stream;
determining, according to the value range Rx corresponding to the index x, that a value of a first part of the compressed string length information is Rx_start;
successively determining values of remaining parts of the compressed string length information; and
determining the value of the compressed string length information according to the value of the first part and the values of the remaining parts.

14. The method according to claim 2, wherein the compressed string length information comprises a string length code of the current string; and the determining the string length information according to the compressed string length information and the SLR comprises:
multiplying the string length code of the current string by the SLR to obtain the string length of the current string.

15. The method according to claim 2, wherein the compressed string length information comprises a code of a number of remaining pixels in a decoding block to which the current string belongs after the current string is decoded;
the determining the string length information according to the compressed string length information and the SLR comprises:
multiplying the code of the number of remaining pixels by the SLR to obtain the number of remaining pixels in the decoding block to which the current string belongs after the current string is decoded; and
the determining the string length of the current string according to the string length information comprises:
acquiring a total number of pixels of the decoding block to which the current string belongs;
acquiring a number of decoded pixels of the decoding block to which the current string belongs; and
determining the string length of the current string based on the total number of pixels, the number of decoded pixels, and the number of remaining pixels after the current string is decoded.

16. The method according to claim 2, wherein the compressed string length information comprises a first flag, the first flag being used for indicating whether the current string is the last string in a decoding block to which the current string belongs;
the determining the string length information according to the compressed string length information and the SLR comprises:
acquiring a code of a number of remaining pixels in the decoding block to which the current string belongs after the current string is decoded, when it is determined according to the first flag that the current string is not the last string, the string length information further comprising the code of the number of remaining pixels in the decoding block to which the current string belongs after the current string is decoded; or the string length information further comprising the code of the number of remaining pixels in the decoding block to which the current string belongs after the current string is decoded minus 1; and
multiplying the code of the number of remaining pixels by the SLR to obtain the number of remaining pixels in the decoding block to which the current string belongs after the current string is decoded; and
the determining the string length of the current string according to the string length information comprises:
acquiring a total number of pixels of the decoding block to which the current string belongs;
acquiring a number of decoded pixels of the decoding block to which the current string belongs; and
subtracting the number of decoded pixels from the total number of pixels to obtain the string length of the current string, when the current string is the last string; and
determining the string length of the current string based on the total number of pixels, the number of decoded pixels, and the number of remaining pixels after the current string is decoded, when the current string is not the last string.

17. The method according to claim 1, further comprising:
selecting, from a plurality of inverse binarization methods according to the SLR of the current string, a method of inversely binarizing the binary symbol string;
or
selecting, from a plurality of inverse binarization methods according to a maximum value of the string length information, a method of inversely binarizing the binary symbol string;
or
selecting, from a plurality of inverse binarization methods according to a quotient of a maximum value of the number of remaining pixels of the decoding block to which the current string belongs and the SLR of the current string, a method of inversely binarizing the binary symbol string;
or
selecting, from a plurality of inverse binarization methods according to a size of the decoding block to which the current string belongs, a method of inversely binarizing the binary symbol string.

18. A computer device, comprising a processor and a memory, the memory storing at least one instruction, at least one program, a code set, or an instruction set, and the at least one instruction, the at least one program, the code set, or the instruction set being loaded and executed by the processor to implement:
decoding, from a bit stream, a binary symbol string with string length information of a current string and a string length resolution (SLR) of the current string, the string length information comprising information related to a string length of the current string, wherein the SLR is a minimum string length by which a CU is partitioned into pixel strings;
inversely binarizing the binary symbol string according to the SLR of the current string, to obtain the string length information; and
determining the string length of the current string according to the string length information,
wherein a length of a pixel string of the current string is a multiple of the SLR and is aligned with a number of pixels that a memory of the computer device is configured to simultaneously process in parallel; and
decoding the SLR of the current string comprises one of:
decoding the SLR of the current string from an image header of an image to which the current string belongs, strings comprised in the image to which the current string belongs having a same SLR;
decoding the SLR of the current string from a patch header of a patch to which the current string belongs, strings comprised in the patch to which the current string belongs having a same SLR;
decoding the SLR of the current string from coding information of a largest coding unit (LCU) to which the current string belongs, strings comprised in the LCU to which the current string belongs having a same SLR; and
decoding the SLR of the current string from coding information of a coding unit (CU) to which the current string belongs, strings comprised in the CU to which the current string belongs having a same SLR.

19. A non-transitory computer-readable storage medium, storing at least one instruction, at least one program, a code set, or an instruction set, the at least one instruction, the at least one program, the code set, or the instruction set being loaded and executed by a processor of a computing device to implement:

decoding, from a bit stream, a binary symbol string with string length information of a current string and a string length resolution (SLR) of the current string, the string length information comprising information related to a string length of the current string, wherein the SLR is a minimum string length by which a CU is partitioned into pixel strings;

inversely binarizing the binary symbol string according to the SLR of the current string, to obtain the string length information; and determining the string length of the current string according to the string length information, wherein a length of a pixel string of the current string is a multiple of the SLR and is aligned with a number of pixels that a memory of the computing device is configured to simultaneously process in parallel; and decoding the SLR of the current string comprises one of:

decoding the SLR of the current string from an image header of an image to which the current string belongs, strings comprised in the image to which the current string belongs having a same SLR;

decoding the SLR of the current string from a patch header of a patch to which the current string belongs, strings comprised in the patch to which the current string belongs having a same SLR;

decoding the SLR of the current string from coding information of a largest coding unit (LCU) to which the current string belongs, strings comprised in the LCU to which the current string belongs having a same SLR; and decoding the SLR of the current string from coding information of a coding unit (CU) to which the current string belongs, strings comprised in the CU to which the current string belongs having a same SLR.

* * * * *